(12) United States Patent
Kimba Dit Adamou et al.

(10) Patent No.: US 11,405,785 B2
(45) Date of Patent: Aug. 2, 2022

(54) DATA RADIO BEARER INTEGRITY PROTECTION CONFIGURATION METHOD, USER EQUIPMENT AND NETWORK DEVICE

(71) Applicant: VIVO MOBILE COMMUNICATION CO., LTD., Chang'an Dongguan (CN)

(72) Inventors: Boubacar Kimba Dit Adamou, Chang'an Dongguan (CN); Xiaodong Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 233 days.

(21) Appl. No.: 16/622,631

(22) PCT Filed: Jun. 12, 2018

(86) PCT No.: PCT/CN2018/090795
§ 371 (c)(1),
(2) Date: Dec. 13, 2019

(87) PCT Pub. No.: WO2018/228365
PCT Pub. Date: Dec. 20, 2018

(65) Prior Publication Data
US 2021/0153021 A1    May 20, 2021

(30) Foreign Application Priority Data
Jun. 15, 2017 (CN) .......................... 201710454150.3

(51) Int. Cl.
*H04W 12/10* (2021.01)
*H04L 41/0677* (2022.01)
(Continued)

(52) U.S. Cl.
CPC ......... *H04W 12/10* (2013.01); *H04L 41/0677* (2013.01); *H04L 41/0803* (2013.01); *G06F 21/64* (2013.01)

(58) Field of Classification Search
USPC .......................................................... 726/26
See application file for complete search history.

(56) References Cited

U.S. PATENT DOCUMENTS

2006/0294361 A1  12/2006  Matusz et al.
2008/0250294 A1  10/2008  Ngo et al.
(Continued)

FOREIGN PATENT DOCUMENTS

CN    101068436 A    11/2007
CN    101199184 A    6/2008
(Continued)

OTHER PUBLICATIONS

1St Chinese Office Action for Chinese Application No. 201710454150. 3, dated Nov. 28, 2019 (Nov. 28, 2019)—21 pages (English translation—37 pages).
(Continued)

*Primary Examiner* — Sakinah White Taylor
(74) *Attorney, Agent, or Firm* — Culhane Meadows PLLC; Stephen J. Weed

(57) ABSTRACT

A Data Radio Bearer (DRB) integrity protection configuration method, a network device and a User Equipment (UE) are provided. The DRB integrity protection configuration method includes: receiving configuration information indicating a DRB integrity protection configuration from a network device; and enabling a predetermined control process for DRB integrity protection in accordance with the configuration information. The predetermined control process is a DRB integrity protection activation process or a DRB integrity protection deactivation process.

12 Claims, 10 Drawing Sheets transmitting configuration information indicating a DRB integrity protection configuration to a UE —41

(51) Int. Cl.
*H04L 41/0803* (2022.01)
*G06F 21/64* (2013.01)

(56) References Cited

U.S. PATENT DOCUMENTS

| | | | |
|---|---|---|---|
| 2009/0141670 A1 | 6/2009 | Ho | |
| 2009/0196275 A1 | 8/2009 | Damnjanovic et al. | |
| 2011/0188408 A1 | 8/2011 | Yi et al. | |
| 2012/0182929 A1 | 7/2012 | Chen et al. | |
| 2012/0196609 A1 | 8/2012 | Barreto et al. | |
| 2012/0289220 A1 | 11/2012 | Yang et al. | |
| 2012/0307709 A1 | 12/2012 | Östergaard et al. | |
| 2012/0315878 A1 | 12/2012 | Deng | |
| 2013/0236016 A1 | 9/2013 | Zhang et al. | |
| 2014/0029586 A1* | 1/2014 | Loehr | H04B 3/36 370/336 |
| 2014/0181899 A1 | 6/2014 | Mukherjee et al. | |
| 2015/0163678 A1 | 6/2015 | Zhang et al. | |
| 2016/0302110 A1 | 10/2016 | Baboescu et al. | |
| 2016/0338139 A1* | 11/2016 | Kwon | H04W 76/38 |

FOREIGN PATENT DOCUMENTS

| | | |
|---|---|---|
| CN | 101517995 A | 8/2009 |
| CN | 101810026 A | 8/2010 |
| CN | 101940025 A | 1/2011 |
| CN | 102098676 A | 6/2011 |
| CN | 102448058 A | 5/2012 |
| CN | 102461299 A | 5/2012 |
| CN | 102487507 A | 6/2012 |
| CN | 102714794 A | 10/2012 |
| CN | 102821484 A | 12/2012 |
| CN | 103188681 A | 7/2013 |
| CN | 103314548 A | 9/2013 |
| CN | 104144524 A | 11/2014 |
| CN | 106714159 A | 5/2017 |

OTHER PUBLICATIONS

2Nd Chinese Office Action for Chinese Application No. 201710454150.3, dated Mar. 20, 2020 (Mar. 20, 2020)—17 pages (English translation—28 pages).
Chinese Search Report for Chinese Application No. 201710454150.3, dated Apr. 17, 2019 (Apr. 17, 2019)—5 pages (English translation—3 pages).
Extended European Search Report for European Application No. 18816605.2, dated Mar. 25, 2020 (Mar. 25, 2020)—11 pages.
International Search Report and Written Opinion for International Application No. PCT/CN2018/090795, dated Dec. 26, 2019 (Dec. 26, 2019)—11 pages (English translation—7 pages).
Nokia: "pCR UP Integrity Security Solution Per Bearer", 3GPP TSG SA WG3 (Security) Meeting #87; S3-171352, May 15, 2017, Ljubljana, Slovenia, 3 pages.
Samsung: "NR Security: User Plane Integrity Protection" R2-1703339, 3GPP TSG-RAN WG2 Meeting #97bis, Spokane, WA, US, Jan. 17, 2017, 3 pages.

* cited by examiner transmitting configuration information indicating a DRB integrity protection configuration to a UE — 41
Fig. 4
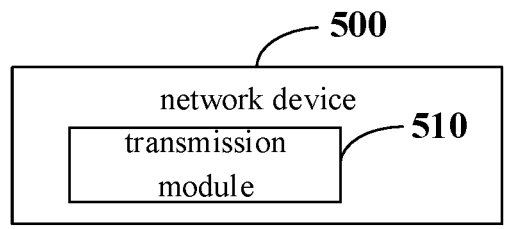
Fig. 5
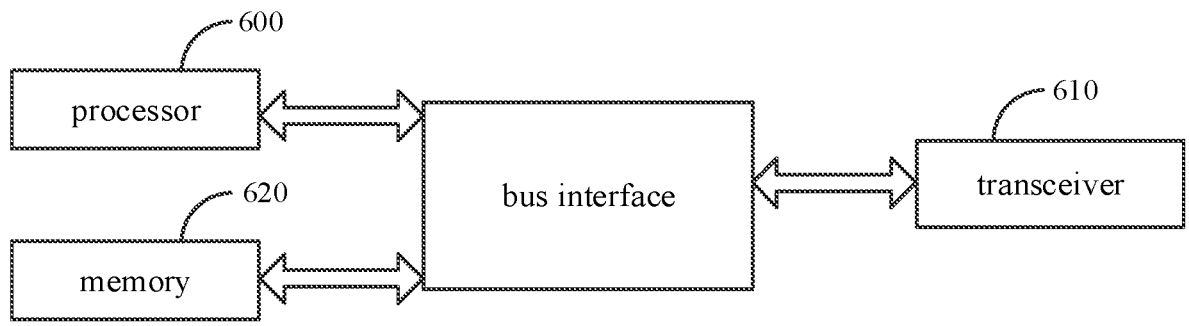
Fig. 6
configuring an MAC PDU in accordance with an MAC-I — 71
transmitting the configured MAC PDU to a UE — 72
Fig. 7

DATA RADIO BEARER INTEGRITY PROTECTION CONFIGURATION METHOD, USER EQUIPMENT AND NETWORK DEVICE

CROSS-REFERENCE TO RELATED APPLICATION

The present application is the U.S. national phase of PCT Application No. PCT/CN2018/090795 filed on Jun. 12, 2018, which claims a priority of the Chinese patent application No. 201710454150.3 filed on Jun. 15, 2017, which is incorporated herein by reference in its entirety.

TECHNICAL FIELD

The present disclosure relates to the field of communication technology, in particular to a data radio bearer integrity protection configuration method, a User Equipment (UE) and a network device.

BACKGROUND

Along with the development of the wireless mobile communication technology, a high data rate, a low delay and low cost are increasingly demanded. In a Long Term Evolution (LTE) system, Dual Connectivity (DC)-based network architecture has been introduced. In a DC scenario, a Data Radio Bearer (DRB) includes a Secondary Cell Group (SCG) bearer, a Master Cell Group (MCG) bearer and a split bearer.

In a $5^{th}$-Generation (5G) mobile communication system (also called as a New Radio (NR) system), a DC scenario similar to that in the LTE system has been introduced so as to transmit data at a high data rate, a low delay and high reliability. Although it is able to transmit the data at the high data rate, the low delay and the high reliability in the DC scenario, a DRB failure may probably occur during the actual wireless data transmission or a switching process between a master cell and a secondary cell. Hence, a DRB integrity protection process will be introduced into the 5G system so as to ensure consistency in data volumes received and transmitted via the DRB. However, there is currently no scheme for triggering the DRB integrity protection process in the related art.

SUMMARY

In one aspect, the present disclosure provides in some embodiments a DRB integrity protection configuration method for a UE, including: receiving configuration information indicating a DRB integrity protection configuration from a network device; and enabling a predetermined control process for DRB integrity protection in accordance with the configuration information. The predetermined control process is a DRB integrity protection activation process or a DRB integrity protection deactivation process.

In another aspect, the present disclosure provides in some embodiments a UE, including: a first reception module configured to receive configuration information indicating a DRB integrity protection configuration from a network device; and a first processing module configured to enable a predetermined control process for DRB integrity protection in accordance with the configuration information. The predetermined control process is a DRB integrity protection activation process or a DRB integrity protection deactivation process.

In yet another aspect, the present disclosure provides in some embodiments a UE, including a processor, a memory, and a computer program stored in the memory and executed by the processor. The processor is configured to execute the computer program so as to implement the above-mentioned DRB integrity protection configuration method.

In still yet another aspect, the present disclosure provides in some embodiments a computer-readable storage medium storing therein a computer program. The computer program is executed by a processor so as to implement the above-mentioned DRB integrity protection configuration method.

In still yet another aspect, the present disclosure provides in some embodiments a DRB integrity protection configuration method for a network device, including transmitting configuration information indicating a DRB integrity protection configuration to a UE.

In still yet another aspect, the present disclosure provides in some embodiments a network device, including a transmission module configured to transmit configuration information indicating a DRB integrity protection configuration to a UE.

In still yet another aspect, the present disclosure provides in some embodiments a network device, including a processor, a memory, and a computer program stored in the memory and executed by the processor. The processor is configured to execute the computer program so as to implement the above-mentioned DRB integrity protection configuration method.

In still yet another aspect, the present disclosure provides in some embodiments a computer-readable storage medium storing therein a computer program. The computer program is executed by a processor so as to implement the above-mentioned DRB integrity protection configuration method.

In still yet another aspect, the present disclosure provides in some embodiments a Media Access Control (MAC) Packet Data Unit (PDU) configuration method for a network device, including: configuring an MAC PDU in accordance with a message authentication code for integrity (MAC-I), a header of the MAC PDU including an indication field indicating the MAC-I; and transmitting the configured MAC PDU to a UE.

In still yet another aspect, the present disclosure provides in some embodiments a network device, including: a configuration module configured to configure an MAC PDU in accordance with an MAC-I, a header of the MAC PDU including an indication field indicating the MAC-I; and a transmission module configured to transmit the configured MAC PDU to a UE.

In still yet another aspect, the present disclosure provides in some embodiments a network device, including a processor, a memory, and a computer program stored in the memory and executed by the processor. The processor is configured to execute the computer program so as to implement the above-mentioned MAC PDU configuration method.

In still yet another aspect, the present disclosure provides in some embodiments a computer-readable storage medium storing therein a computer program. The computer program is executed by a processor so as to implement the above-mentioned MAC PDU configuration method.

In still yet another aspect, the present disclosure provides in some embodiments an MAC PDU processing method for a UE, including receiving an MAC PDU from a network device. A header of the MAC PDU includes an indication field indicating an MAC-I.

In still yet another aspect, the present disclosure provides in some embodiments a UE, including a reception module configured to receive an MAC PDU from a network device. A header of the MAC PDU includes an indication field indicating an MAC-I.

In still yet another aspect, the present disclosure provides in some embodiments a UE, including a processor, a memory, and a computer program stored in the memory and executed by the processor. The processor is configured to execute the computer program so as to implement the above-mentioned MAC PDU processing method.

In still yet another aspect, the present disclosure provides in some embodiments a computer-readable storage medium storing therein a computer program. The computer program is executed by a processor so as to implement the above-mentioned MAC PDU processing method.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

FIG. 4 is a flow chart of a DRB integrity protection configuration method for a network device according to the first embodiment of the present disclosure;

FIG. 5 is a schematic view showing the network device according to the first embodiment of the present disclosure;

FIG. 6 is a block diagram of the network device according to the first embodiment of the present disclosure;

FIG. 7 is a flow chart of an MAC PDU processing method for a network device according to a second embodiment of the present disclosure;

DETAILED DESCRIPTION

Figure 1:
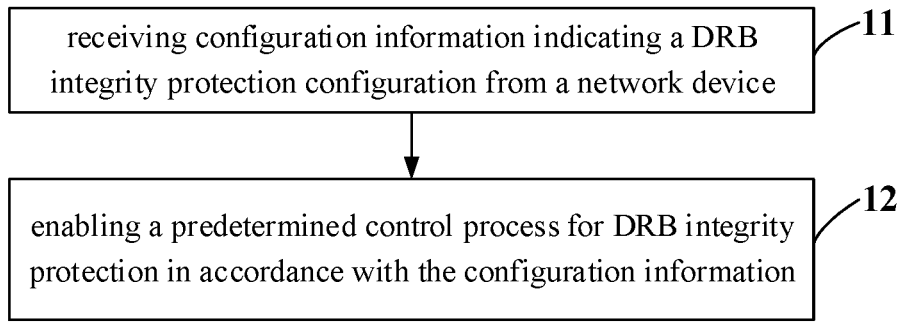
FIG. 1 is a flow chart of a DRB integrity protection configuration method for a UE according to a first embodiment of the present disclosure.

The present disclosure will be described hereinafter in conjunction with the drawings and embodiments. The following embodiments are for illustrative purposes only, but shall not be used to limit the scope of the present disclosure.

Actually, the embodiments are provided so as to facilitate the understanding of the scope of the present disclosure.

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device.

The present disclosure provides in some embodiments a DRB integrity protection configuration method for a UE which, as shown in FIG. 1, includes the following Steps 11 and 12.

Step 11: receiving configuration information indicating a DRB integrity protection configuration from a network device.

To be specific, Step 11 may include receiving the configuration information indicating the DRB integrity protection configuration from the network device through an MAC CE, Radio Resource Control (RRC) signaling, physical layer signaling or Packet Data Convergence Protocol (PDCP) control signaling.

Alternatively, Step 11 may also include receiving a predetermined control process start instruction for DRB integrity protection from the network device through the MAC CE, and the configuration information indicating the DRB integrity protection configuration may be carried in the predetermined control process start instruction.

Step 12: enabling a predetermined control process for DRB integrity protection in accordance with the configuration information.

The predetermined control process may be a DRB integrity protection activation process or a DRB integrity protection deactivation process. In this way, the UE may receive the configuration information from the network device, acquire the DRB integrity protection configuration in accordance with the configuration information, and activate the DRB integrity protection according to the practical need, so as to protect a DRB, thereby to improve the reliability of the data transmission.

To be specific, Step 11 may include receiving first configuration information indicating a DRB configuration from the network device. The first configuration information may carry a DRB integrity protection command by default. Here, the network device may configure a DRB integrity protection function through the RRC signaling, the PDCP signaling, the MAC CE or the physical layer signaling. When the first configuration information indicating the DRB configuration is issued by the network device, the network device has configured the DRB integrity protection command for the UE by default. When the UE has received the first configuration information and initiated service transmission (has transmitted or received a service), the DRB integrity protection may be activated. When the DRB has been released, the DRB integrity protection may be deactivated.

Further, identification information about a corresponding DRB may be carried in the DRB integrity protection command. When DRBs configured by the network device for the UE includes DRB1, DRB2, DRB3 and DRB4 but merely the identification information about DRB2 is carried in the DRB integrity protection command, the UE may initiate an integrity protection process for DRB2 in the case that a service is transmitted on DRB2. When DRB2 has been released, the integrity protection over DRB2 may be deactivated.

A scenario where the DRB integrity protection command is carried, by default, in the configuration information about an integrity protection function has been described hereinabove. A scenario where the DRB integrity protection command and the configuration information about the integrity protection function are transmitted separately will be described hereinafter. In other words, the DRB integrity protection process is not initiated immediately after the establishment of the DRB, and instead, the corresponding integrity protection process may be initiated after the corresponding DRB has been used for a certain time period.

To be specific, Step 12 may include: upon the receipt of the configuration information from the network device, receiving a first command for activating the DRB integrity protection from the network device; and upon the receipt of the first command, activating the DRB integrity protection.

In addition, Step 12 may further include: receiving a second command for deactivating the DRB integrity protection from the network device; and upon the receipt of the second command, deactivating the DRB integrity protection.

The first command for activating the DRB integrity protection and the second command for deactivating the DRB integrity protection may be received from the network device through enhanced RRC signaling, MAC CE signaling or physical layer signaling.

Here, the network device may configure the DRB integrity protection function through the RRC signaling, the PDCP signaling or the MAC CE signaling, and transmit the corresponding command for activating the DRB integrity protection (the first command) or the corresponding commend for deactivating the DRB integrity protection (second command) through the enhanced RRC signaling, the MAC CE signaling or the physical layer signaling. Upon the receipt of the first command, the UE may activate the corresponding DRB integrity protection process, and upon the receipt of the second command, the UE may deactivate the corresponding DRB integrity protection process.

A scenario where the DRB integrity protection activation or deactivation process is initiated in accordance with the command received by the UE from the network device has been described hereinabove. A scenario where the DRB integrity protection is activated by the UE on its own initiative will be described hereinafter.

To be specific, Step 12 may include, upon the receipt of the configuration information from the network device, when an event indicating a failure of the DRB integrity protection has been detected, transmitting request information for requesting the activation of the DRB integrity protection to the network device, so that the network device activates the DRB integrity protection in accordance with the request information.

The transmitting the request information for requesting the activation of the DRB integrity protection to the network device may include transmitting the request information for requesting the activation of the DRB integrity protection to the network device through the enhanced RRC signaling or the MAC CE signaling.

In this scenario, the network device may configure the DRB integrity protection function through the RRC signaling, the DPCP signaling or the MAC CE signaling, and then transmit the configured DRB integrity protection function to the UE. Upon the detection of the even indicating the failure of the DRB integrity protection, the UE may transmit the request information for requesting the activation of the DRB integrity protection to the network device, so as to re-activate the DRB integrity protection process.

Apart from the above-mentioned modes for initiating the DRB integrity protection activation or deactivation process, the following configuration modes will also be provided.

To be specific, Step 12 may include: upon the receipt of a first instruction for initiating the DRB integrity protection activation process from the network device, activating the DRB integrity protection; or upon the receipt of the second command for initiating the DRB integrity protection deactivation process from the network device, deactivating the DRB integrity protection.

The configuration information may include at least one of deactivation timer information for initiating the DRB integrity protection deactivation process, activation timer information for initiating the DRB integrity protection activation process, activation sequence number information for initiating the DRB integrity protection deactivation process, and deactivation sequence number information for initiating the DRB integrity protection deactivation process.

Subsequent to activating the DRB integrity protection, when the configuration information includes the deactivation timer information and/or the activation timer information and the first instruction for initiating the DRB integrity protection activation process has been received from the network device, the DRB integrity protection configuration method may further include: enabling a corresponding deactivation timer in accordance with the deactivation timer information; and when the deactivation timer has been expired, deactivating the DRB integrity protection. In other words, upon the receipt of the first instruction, the UE may immediately activate the DRB integrity protection function, and perform the DRB integrity protection. In addition, the UE may enable the deactivation timer at the same time, so as to define a time length of the DRB integrity protection. When the deactivation timer has been expired, the UE may deactivate the DRB integrity protection function.

Similarly, subsequent to deactivating the DRB integrity protection, when a second instruction for initiating the DRB integrity protection deactivating process has been received from the network device, the DRB integrity protection configuration method may further include: enabling a corresponding activation timer in accordance with the activation timer information; and when the activation timer has been expired, activating the DRB integrity protection. In other words, upon the receipt of the second instruction, the UE may immediately deactivate the DRB integrity protection function. However, in order to ensure the reliability of the data transmission, the UE may enable the activation timer at the same time. When the activation timer has been expired, the UE may activate the DRB integrity protection function, so as to restore the DRB integrity protection.

When the configuration information includes the activation sequence number information and the first instruction for initiating the DRB integrity protection activation process has been received from the network device, the activating the DRB integrity protection may include, when the first instruction for initiating the DRB integrity protection activation process has been received from the network device and a sequence number of a data packet transmitted by the UE is an activation sequence number corresponding to the activation sequence number information, activating the DRB integrity protection. It should be appreciated that, in order to ensure the data reliability, an activation sequence number range of a predetermined length may be carried in the activation sequence number information. When the sequence number of the transmitted data packet is a start sequence number of the activation sequence number range, the DRB integrity protection may be activated, and when the sequence number of the transmitted data packet is an end sequence number of the activation sequence number range, the DRB integrity protection may be deactivated.

Similarly, when the configuration information includes the deactivation sequence number information and the second instruction for initiating the DRB integrity protection deactivation process has been received from the network device, the deactivating the DRB integrity protection may include, when the second instruction for initiating the DRB integrity protection deactivation process has been received from the network device and a sequence number of a data packet transmitted by the UE is an activation sequence number corresponding to the deactivation sequence number information, deactivating the DRB integrity protection. It should be appreciated that, in order to ensure the data reliability, a deactivation sequence number range of a predetermined length may be carried in the deactivation sequence number information. When the sequence number of the transmitted data packet is a start sequence number of the deactivation sequence number range, the DRB integrity protection may be deactivated, and when the sequence number of the transmitted data packet is an end sequence number of the deactivation sequence number range, the DRB integrity protection may be activated.

Further, when the configuration information includes the activation sequence number information as well as the deactivation sequence number information, the first instruction for initiating the DRB integrity protection activation process has been received from the network device, and the sequence number of the data packet transmitted by the UE is the activation sequence number corresponding to the activation sequence number information, the DRB integrity protection may be activated. It should be appreciated that, in order to ensure the data reliability, an activation sequence number range of a predetermined length may be carried in the activation sequence number information. When the sequence number of the transmitted data packet is a start sequence number of the activation sequence number range, the DRB integrity protection may be activated, and when the sequence number of the transmitted data packet is an end sequence number of the activation sequence number range, the DRB integrity protection may be deactivated. Alternatively, merely the start sequence number for activating the DRB integrity protection may be carried in the activation sequence number information. At this time, in order to ensure the data reliability and further control the power consumption of the UE, when the sequence number of the transmitted data packet is the deactivation sequence number corresponding to the deactivation sequence number information, the DRB integrity protection may be deactivated.

Similarly, when the configuration information includes the activation sequence number information as well as the deactivation sequence number information, the second instruction for initiating the DRB integrity protection deactivation process has been received from the network device, and the sequence number of the data packet transmitted by the UE is the deactivation sequence number corresponding to the deactivation sequence number information, the DRB integrity protection may be deactivated. It should be appreciated that, in order to ensure the data reliability, a deactivation sequence number range of a predetermined length may be carried in the deactivation sequence number information. When the sequence number of the transmitted data packet is a start sequence number of the deactivation sequence number range, the DRB integrity protection may be deactivated, and when the sequence number of the transmitted data packet is an end sequence number of the deactivation sequence number range, the DRB integrity protection may be activated. Alternatively, merely the start sequence number for deactivating the DRB integrity protection may be carried in the deactivation sequence number information. At this time, in order to ensure the data reliability, when the sequence number of the transmitted data packet is the activation sequence number corresponding to the activation sequence number information, the DRB integrity protection may be activated.

When the configuration information includes the activation sequence number information and a deactivation timer, in order to ensure the data reliability and further control the power consumption of the UE, the UE may enable the deactivation timer while activating the DRB integrity protection. When the deactivation timer has been expired, the DRB integrity protection may be deactivated.

When the configuration information includes the deactivation sequence number information and the activation timer, in order to ensure the data reliability, the UE may enable the activation timer while deactivating the DRB integrity protection. When the activation timer has been expired, the DR integrity protection may be activated.

According to the DRB integrity protection configuration method in the embodiments of the present disclosure, the UE may receive the configuration information from the network device, acquire the DRB integrity protection configuration in accordance with the configuration information, and further activate the DRB integrity protection according to the practical need. As a result, it is able to protect the DRB and improve the reliability of the data transmission.

The DRB integrity protection configuration method has been described hereinabove in details, and the UE corresponding thereto will be described hereinafter in conjunction with the drawings.

Figure 2:
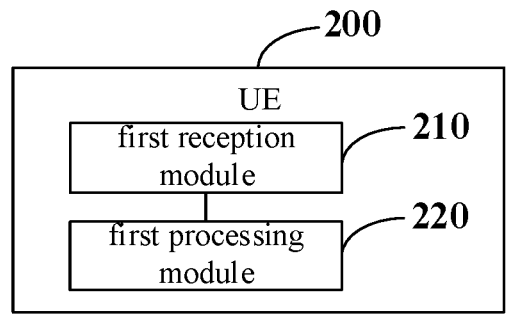
FIG. 2 is a schematic view showing the UE according to the first embodiment of the present disclosure.

As shown in FIG. 2, the present disclosure further provides in some embodiments a UE 200 capable of receiving configuration information indicating a DRB integrity protection configuration from a network device and enabling a predetermined control process for DRB integrity protection in accordance with the configuration information, with a same beneficial effect. The predetermined control process may be a DRB integrity protection activation process or a DRB integrity protection deactivation process. The UE 200 may include: a first reception module 210 configured to receive the configuration information indicating the DRB integrity protection configuration from the network device; and a first processing module 220 configured to enable the predetermined control process for DRB integrity protection in accordance with the configuration information. The predetermined control process may be the DRB integrity protection activation process or the DRB integrity protection deactivation process.

The first reception module 210 may include a first reception sub-module configured to receive first configuration information indicating a DRB configuration from the network device. The first configuration information may carry a DRB integrity protection command by default. Identification information about a corresponding DRB may be carried in the DRB integrity protection command.

The first processing module 220 may include: a first processing sub-module configured to, when the first configuration information has been received and service transmission has been initiated, activate the DRB integrity protection; or a second processing sub-module configured to, when the DRB has been released, deactivate the DRB integrity protection.

The first processing module 220 may include: a second reception sub-module configured to, upon the receipt of the configuration information from the network device, receive a first command for activating the DRB integrity protection from the network device; and a third processing sub-module configured to, upon the receipt of the first command, activate the DRB integrity protection.

The second reception sub-module may include a first reception unit configured to receive the first command for activating the DRB integrity protection from the network device through enhanced RRC signaling, MAC CE signaling or physical layer signaling.

The first processing module 220 may further include: a third reception sub-module configured to receive a second command for deactivating the DRB integrity protection from the network device; and a fourth processing sub-module configured to, upon the receipt of the second command, deactivate the DRB integrity protection.

The UE may further include a second processing module configured to, upon the receipt of the configuration information from the network device, when an event indicating a failure of the DRB integrity protection has been detected, transmit request information for requesting the activation of the DRB integrity protection to the network device, so that the network device activates the DRB integrity protection in accordance with the request information.

The second processing module may include a first transmission sub-module configured to transmit the request information for requesting the activation of the DRB integrity protection to the network device through the enhanced RRC signaling or the MAC CE signaling.

The first processing module 220 may include: a fifth processing sub-module configured to, upon the receipt of a first instruction for initiating a DRB integrity protection activation process from the network device, activate the DRB integrity protection; or a sixth processing sub-module configured to, upon the receipt of a second instruction for initiating a DRB integrity protection deactivation process from the network device, deactivate the DRB integrity protection.

The configuration information may include at least one of deactivation timer information for initiating the DRB integrity protection deactivation process, activation timer information for initiating the DRB integrity protection activation process, activation sequence number information for initiating the DRB integrity protection deactivation process, and deactivation sequence number information for initiating the DRB integrity protection deactivation process.

The fifth processing sub-module may include a first processing unit configured to, when the configuration information includes the activation sequence number information, the first instruction for initiating the DRB integrity protection activation process has been received from the network device, and a sequence number of a transmitted data packet is an activation sequence number corresponding to the activation sequence number information, activate the DRB integrity protection.

The first processing module 220 may further include: a first start sub-module configured to, when the configuration information includes the deactivation timer information, start a corresponding deactivation timer in accordance with the deactivation timer information; and a seventh processing sub-module configured to, when the deactivation timer has been expired, deactivate the DRB integrity protection.

The sixth processing sub-module may include a second processing unit configured to, when the configuration information includes the deactivation sequence number information, the second instruction for initiating the DRB integrity protection deactivation process is received from the network device, and the sequence number of the transmitted data packet is a deactivation sequence number corresponding to the deactivation sequence number information, deactivate the DRB integrity protection.

The first processing module 220 may further include: a second start sub-module configured to, when the configuration information includes the activation timer information, start a corresponding activation timer according to the activation timer information; and an eighth processing sub-module configured to, when the activation timer has been expired, activate the DRB integrity protection.

The first reception module 210 may include a fourth reception sub-module configured to receive a predetermined control process start instruction for the DRB integrity protection from the network device through an MAC CE, and the configuration information indicating the DRB integrity protection configuration may be carried in the predetermined control process start instruction.

The first reception module 210 may include a fifth reception sub-module configured to receive the configuration information indicating a predetermined control process configuration for the DRB integrity protection from the network device through the MAC CE, RRC signaling, the physical layer signaling or PDCP control signaling.

It should be appreciated that, the UE in the embodiments of the present disclosure may receive the configuration information from the network device, acquire the DRB integrity protection configuration in accordance with the configuration information, and activate the DRB integrity protection according to the practical need. As a result, it is able to protect the DRB, and improve the reliability of the data transmission.

In order to achieve the above purpose in a better manner, the present disclosure further provides in some embodiments a UE, which includes a processor, a memory, and a computer program stored in the memory and executed by the processor. The processor is configured to execute the computer program so as to implement the above-mentioned DRB integrity protection configuration method. In addition, the present disclosure further provides in some embodiments a computer-readable storage medium storing therein a computer program. The computer program is executed by a processor so as to implement the above-mentioned DRB integrity protection configuration method.

Figure 3:
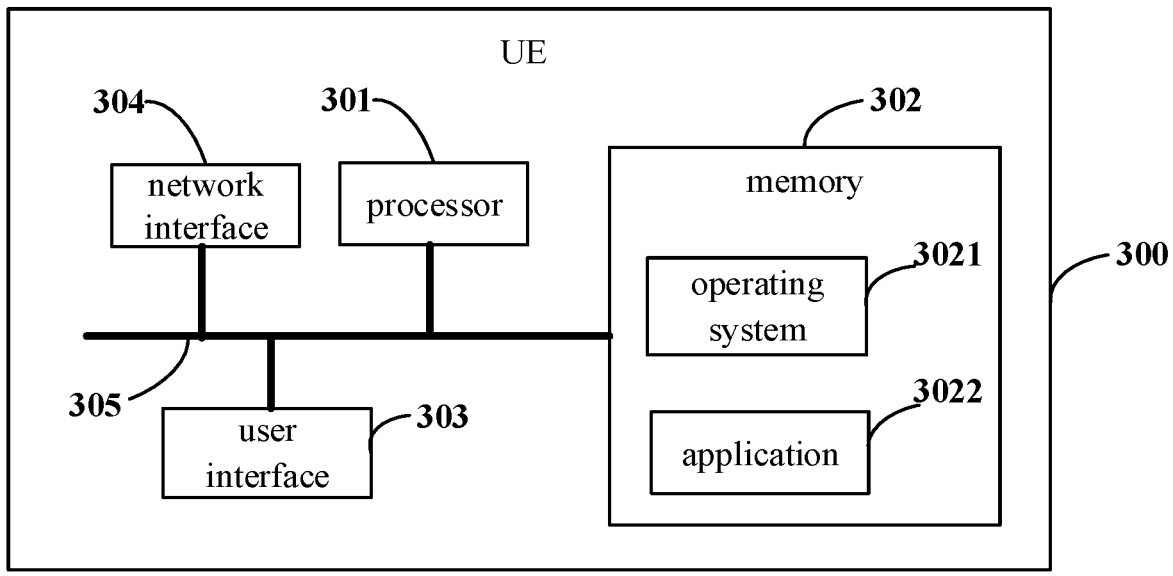
FIG. 3 is a block diagram of the UE according to the first embodiment of the present disclosure.

To be specific, as shown in FIG. 3, the UE 300 may include at least one processor 301, a memory 302, a user interface 303 and a network interface 304. The components of the UE 300 may be coupled together through a bus system 305. It should be appreciated that, the bus system 305 is configured to achieve connection and communication among the components. Apart from a data bus, the bus system 305 may further include a power source bus, a control bus and a state signal bus. For clarification, all these buses in FIG. 3 may be collectively called as bus system 305.

The user interface 303 may include a display, a keyboard or a pointing device (e.g., mouse, track ball, touch plate or touch panel).

It should be appreciated that, the memory 302 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 302 intends to include, but not limited to, the above-mentioned and any other appropriate memories.

In a possible embodiment of the present disclosure, the following elements may be stored in the memory 302: an executable module or data structure, a subset or an extended set thereof, an operating system 3021 and an application 3022.

The operating system 3021 may include various system programs, e.g., a framework layer, a core layer and a driving layer, so as to implement various basic services and process hardware-based tasks. The application 3022 may include various applications, e.g., Media Player and Browser, so as to implement various application services. The programs for implementing the above-mentioned method may be included in the application 3022.

The UE 300 may further include a computer program stored in the memory 302 and executed by the processor 301, e.g., a program or instruction stored in the application 3022. The computer program is executed by the processor 301, so as to: receive configuration information indicating a DRB integrity protection configuration from a network device; and enable a predetermined control process for DRB integrity protection in accordance with the configuration information. The predetermined control process may be a DRB integrity protection activation process or a DRB integrity protection deactivation process.

The above-mentioned method may be applied to, or implemented by, the processor 301. The processor 301 may be an integrated circuit (IC) having a signal processing capability. During the implementation, the steps of the above-mentioned method may be completed through an integrated logic circuit of hardware in the processor 301 or instructions in the form of software. The processor 301 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 302, and the processor 301 may read information stored in the memory 302 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

To be specific, the processor 301 is further configured to execute the computer program so as to receive first configuration information indicating a DRB configuration from the network device. The first configuration information may carry a DRB integrity protection command by default. Identification information about a corresponding DRB may be carried in the DRB integrity protection command.

To be specific, the processor 301 is further configured to execute the computer program so as to: when the first configuration information has been received and service transmission has been initiated, activate the DRB integrity protection; or when the DRB has been released, deactivate the DRB integrity protection.

To be specific, the processor 301 is further configured to execute the computer program so as to: upon the receipt of the configuration information from the network device, receive a first command for activating the DRB integrity protection from the network device; and upon the receipt of the first command, activate the DRB integrity protection.

To be specific, the processor 301 is further configured to execute the computer program so as to receive the first command for activating the DRB integrity protection from the network device through enhanced RRC signaling, MAC CE signaling or physical layer signaling.

To be specific, the processor 301 is further configured to execute the computer program so as to: receive a second command for deactivating the DRB integrity protection from the network device; and upon the receipt of the second command, deactivate the DRB integrity protection.

To be specific, the processor 301 is further configured to execute the computer program so as to, upon the receipt of the configuration information from the network device, when an event indicating a failure of the DRB integrity protection has been detected, transmit request information for requesting the activation of the DRB integrity protection to the network device, so that the network device activates the DRB integrity protection in accordance with the request information.

To be specific, the processor 301 is further configured to execute the computer program so as to transmit the request information for requesting the activation of the DRB integrity protection to the network device through the enhanced RRC signaling or the MAC CE signaling.

To be specific, the processor 301 is further configured to execute the computer program so as to: upon the receipt of a first instruction for initiating a DRB integrity protection activation process from the network device, activate the DRB integrity protection; or upon the receipt of a second instruction for initiating a DRB integrity protection deactivation process from the network device, deactivate the DRB integrity protection.

To be specific, the configuration information may include at least one of deactivation timer information for initiating the DRB integrity protection deactivation process, activation timer information for initiating the DRB integrity protection activation process, activation sequence number information for initiating the DRB integrity protection deactivation process, and deactivation sequence number information for initiating the DRB integrity protection deactivation process.

To be specific, when the configuration information includes the activation sequence number information, the processor 301 is further configured to execute the computer program, so as to, when the first instruction for initiating the DRB integrity protection activation process has been received from the network device and a sequence number of a transmitted data packet is an activation sequence number corresponding to the activation sequence number information, activate the DRB integrity protection.

To be specific, when the configuration information includes the deactivation timer information, the processor 301 is further configured to execute the computer program, so as to: start a corresponding deactivation timer in accordance with the deactivation timer information; and when the deactivation timer has been expired, deactivate the DRB integrity protection.

To be specific, when the configuration information includes the deactivation sequence number information, the processor 301 is further configured to read the computer program, so as to, when the second instruction for initiating the DRB integrity protection deactivation process is received from the network device and the sequence number of the transmitted data packet is a deactivation sequence number corresponding to the deactivation sequence number information, deactivate the DRB integrity protection.

To be specific, when the configuration information includes the activation timer information, the processor 301 is further configured to execute the computer program, so as to: start a corresponding activation timer according to the activation timer information; and when the activation timer has been expired, activate the DRB integrity protection.

To be specific, the processor 301 is further configured to execute the computer program so as to receive the configuration information indicating a predetermined control process configuration for the DRB integrity protection from the network device through the MAC CE, RRC signaling, the physical layer signaling or PDCP control signaling.

The UE may be a wireless UE or a wired UE. The wireless UE may be a device capable of providing voice data and/or any other service data to a user, e.g., a handheld device having a wireless connection function, or any other processing device capable of being connected to a wireless modem. The wireless UE may communication with one or more core networks via a Radio Access Network (RAN). The wireless UE may be a mobile terminal, e.g., a mobile phone (or cellular phone), or a computer having the mobile UE, e.g., a portable, pocket-sized, handheld, built-in or vehicle-mounted mobile device, which are capable of exchanging voice and/or data with the RAN. For example, the wireless UE may be a Personal Communication Service (PCS) telephone, a cordless telephone, a Session Initiation Protocol (SIP) phone, a Wireless Local Loop (WLL) station, or a Personal Digital Assistant (PDA). In addition, the wireless terminal may also be called as system, subscriber unit, subscriber station, mobile station, mobile, remote station, remote terminal, access terminal, user terminal, user agent or user device, which will not be particularly defined herein.

According to the embodiments of the present disclosure, the UE may receive the configuration information from the network device, acquire the DRB integrity protection configuration in accordance with the configuration information, and activate the DRB integrity protection according to the practical need. As a result, it is able to protect the DRB and improve the reliability of the data transmission.

The DRB integrity protection configuration method for the UE has been described hereinabove, and the DRB integrity protection configuration method for the network device will be described hereinafter in conjunction with the drawings.

The present disclosure further provides in some embodiments a DRB integrity protection configuration method for a network device which, as shown in FIG. 4, includes Step 41 of transmitting configuration information indicating a DRB integrity protection configuration to a UE.

To be specific, Step 41 may include transmitting a predetermined control process start instruction for DRB integrity protection to the UE through MAC CE signaling or RRC signaling. The configuration information indicating a predetermined control process configuration for the DRB integrity protection may be carried in the predetermined control process start instruction.

Step 41 may further include transmitting the configuration information indicating the DRB integrity protection configuration to the UE through the MAC CE signaling, the RRB signaling, physical layer signaling or PDCP control signaling.

To be specific, Step 41 may further include transmitting first configuration information indicating a DRB configuration to the UE, and the first configuration information may carry a DRB integrity protection command by default. The DRB integrity protection command may carry identification information about a corresponding DRB. Here, the network device may configure a DRB integrity protection function through the RRC signaling, the PDCP signaling, the MAC CE signaling or the physical layer signaling. When the first configuration information indicating the DRB configuration has been issued by the network device, the DRB integrity protection command may be configured for the UE by default. After the UE has received the first configuration information and initiated the service transmission (has transmitted or received a service), the UE may activate the DRB integrity protection. When the DRB has been released, the UE may deactivate the DRB integrity protection.

The configuration information may include at least one of deactivation timer information for initiating the DRB integrity protection deactivation process, activation timer information for initiating the DRB integrity protection activation process, activation sequence number information for initiating the DRB integrity protection deactivation process, and deactivation sequence number information for initiating the DRB integrity protection deactivation process.

Step 41 may further include transmitting a predetermined control process start instruction for the DRB integrity protection to the UE through the MAC CE signaling or the RRC signaling. The predetermined control process start instruction may carry the configuration information about a predetermined control process configuration for the DRB integrity protection.

Step 41 may further include transmitting the configuration information indicating the DRB integrity protection configuration to the UE through the MAC CE signaling, the RRB signaling, the physical layer signaling or the PDCP control signaling.

According to the DRB integrity protection configuration method in the embodiments of the present disclosure, the network device may transmit the configuration information indicating the DRB integrity protection configuration to the UE, so that the UE, upon the receipt of the configuration information, acquires the DRB integrity protection configuration in accordance with the configuration information and further activate the DRB integrity protection according to the practical need. As a result, it is able to protect the DRB and improve the reliability of the data transmission.

The DRB integrity protection configuration method in different scenarios has been described hereinabove, and the network device will be described hereinafter in conjunction with the drawings.

As shown in FIG. 5, the present disclosure provides in some embodiments a network device 500 capable of implementing the above-mentioned DRB integrity protection configuration method with a same beneficial effect. The network device 500 may include a transmission module 510 configured to transmit configuration information indicating a DRB integrity protection configuration to a UE.

The transmission module 510 may include a second transmission sub-module configured to transmit first configuration information indicating a DRB configuration to the UE, and the first configuration information may carry a DRB integrity protection command by default. The DRB integrity protection command may carry identification information about a corresponding DRB.

The configuration information may include at least one of deactivation timer information for initiating the DRB integrity protection deactivation process, activation timer information for initiating the DRB integrity protection activation process, activation sequence number information for initiating the DRB integrity protection deactivation process, and deactivation sequence number information for initiating the DRB integrity protection deactivation process.

The transmission module 510 may further include a third transmission sub-module configured to transmit a predetermined control process start instruction for the DRB integrity protection to the UE through MAC CE signaling or RRC signaling. The predetermined control process start instruction may carry the configuration information about a predetermined control process configuration for the DRB integrity protection.

The transmission module 510 may include a fourth transmission sub-module configured to transmit the configuration information indicating the DRB integrity protection configuration to the UE through the MAC CE signaling, the RRC signaling, physical layer signaling or PDCP control signaling.

It should be appreciated that, the network device in the embodiments of the present disclosure may transmit the configuration information indicating the DRB integrity protection configuration to the UE, so that the UE, upon the receipt of the configuration information, acquire the DRB integrity protection configuration in accordance with the configuration information, and further activates the DRB integrity protection according to the practical need. As a result, it is able to protect the DRB and improve the reliability of the data transmission.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, a determination module may be a processing element arranged separately, or integrated into a chip of the above-mentioned device. In addition, these modules may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the processing elements may each of an Integrated Circuit (IC) having a signal processing capability. During the implementation, the steps of the method or the modules may be implemented through an integrated logic circuit of the processing element in the form of hardware or through instructions in the form of software.

For example, the above modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-chip (SOC).

In order to achieve the above purpose in a better manner, the present disclosure further provides in some embodiments a network device, which includes a processor, a memory, and a computer program stored in the memory and executed by the processor. The processor is configured to execute the computer program so as to implement the above-mentioned DRB integrity protection configuration method. In addition, the present disclosure further provides in some embodiments a computer-readable storage medium storing therein a computer program. The computer program is executed by a processor so as to implement the above-mentioned DRB integrity protection configuration method.

To be specific, as shown in FIG. 6, the network device may include a processor 600, a memory 620 connected to the processor 600 via a bus interface, and a transceiver 610 connected to the processor 600 via the bus interface. The memory 620 is configured to store therein programs and data for the operation of the processor. Data information or a pilot signal may be transmitted through the transceiver 610, and an uplink control channel may be received through the transceiver 610. The processor 600 is configured to call and execute the programs and data stored in the memory 620 so as to transmit configuration information indicating a DRB integrity protection configuration to a UE. The transceiver 610 is configured to receive and transmit data under the control of the processor 600.

In FIG. 6, bus architecture may include a number of buses and bridges connected to each other, so as to connect various circuits for one or more processors 600 and one or more memories 620. In addition, as is known in the art, the bus architecture may be used to connect any other circuits, such as a circuit for a peripheral device, a circuit for a voltage stabilizer and a power management circuit, which are not particularly defined herein. A bus interface may be provided, and the transceiver 610 may consist of a plurality of elements, e.g., a transmitter and a receiver for communication with any other devices over a transmission medium. The processor 600 may take charge of managing the bus architecture as well general processings. The memory 620 may store therein data for the operation of the processor 600.

To be specific, the processor 600 is further configured to transmit through the transceiver 610 first configuration information indicating a DRB configuration to the UE, and the first configuration information may carry a DRB integrity protection command by default. The DRB integrity protection command may carry identification information about a corresponding DRB.

The configuration information may include at least one of deactivation timer information for initiating the DRB integrity protection deactivation process, activation timer information for initiating the DRB integrity protection activation process, activation sequence number information for initiating the DRB integrity protection deactivation process, and deactivation sequence number information for initiating the DRB integrity protection deactivation process.

To be specific, the processor 600 is further configured to transmit through the transceiver 610 a predetermined control process start instruction for the DRB integrity protection to the UE through MAC CE signaling or RRC signaling. The predetermined control process start instruction may carry the configuration information about a predetermined control process configuration for the DRB integrity protection.

To be specific, the processor 600 is further configured to transmit through the transceiver 610 the configuration information indicating the DRB integrity protection configuration to the UE through the MAC CE signaling, the RRC signaling, physical layer signaling or PDCP control signaling.

The network device may be a Base Transceiver Station (BTS) in a Global System for Mobile Communication (GSM) or Code Division Multiple Access (CDMA) system, a NodeB (NB) in a Wideband Code Division Multiple Access (WCDMA) system, an Evolved Node B (eNB or eNodeB) in a Long Term Evolution (LTE) system, a relay or access point, or a base station in a future $5^{th}$-Generation (5G) network, which will not be particularly defined herein.

According to the embodiments of the present disclosure, the network device may transmit the configuration information indicating the DRB integrity protection configuration to the UE, so that the UE, upon the receipt of the configuration information, acquires the DRB integrity protection configuration in accordance with the configuration information, and further activates the DRB integrity protection according to the practical need. As a result, it is able to protect the DRB and improve the reliability of the data transmission.

Second Embodiment

The present disclosure provides in this embodiment an MAC PDU configuration method for a network device which, as shown in FIG. 7, includes the following steps.

Step 71: configuring an MAC PDU in accordance with an MAC-I. A header of the MAC PDU may include an indication field indicating the MAC-I.

Step 72: transmitting the configured MAC PDU to a UE.

The MAC PDU configuration method will be described hereinafter in conjunction with the drawings.

An MAC CE corresponding to the MAC PDU may include at least one of a first indication bit indicating a data packet sequence number, a second indication bit indicating a logical channel serial number, and a third indication bit indicating a DRB identity.

Figure 8:
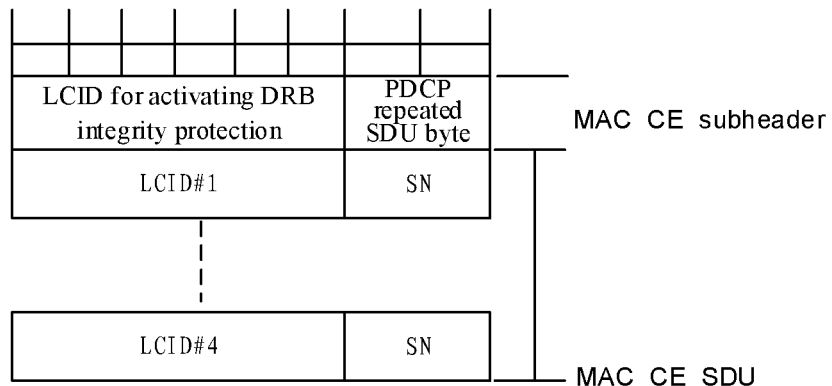
FIGS. 8 and 9 are schematic views showing an MAC Control Element (CE) according to the second embodiment of the present disclosure.
Figure 9:
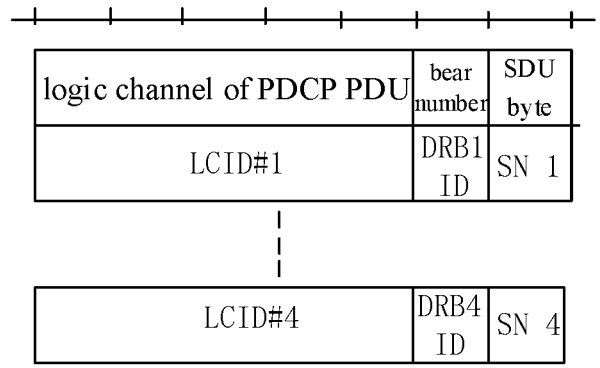

To be specific, taking the integrity protection function as an example, as shown in FIG. 8, former six bits of a sub-header of the MAC CE may be used to indicate a logical channel serial number for activating the DRB integrity protection (e.g., LCID for activating the DRB integrity protection in FIG. 8), and latter two bits may be used to indicate a data packet sequence number for a PDCP repeated Service Data Unit (SDU) byte (e.g., PDCP repeated SDU byte in FIG. 8). Alternatively, as shown in FIG. 9, the former six bits of the sub-header of the MAC CE may be used to indicate the logical channel serial number for activating the DRB integrity protection (e.g., LCID for activating the DRB integrity protection in FIG. 9), a seventh bit may be used to indicate a DRB identity (ID) (e.g., a bearer number in FIG. 9), and an eighth bit may be used to indicate a data packet sequence number indicating the PDCP repeated SDU byte (e.g., the PDCP repeated SDU byte in FIG. 9).

Further, all the data packet sequence numbers may be divided into N sequence number ranges, and different values of the first indication bit may indicate different sequence number ranges, where N is a positive integer. For examples, there may exist 100 data packet sequence numbers, i.e., from 0 to 99, and the data packet sequence numbers may be divided into four ranges, i.e., a first range of 0 to 24, a second range of 25 to 49, a third range of 50 to 74 and a fourth range of 75 to 99. The first indication bit may have values of 00, 01, 10 and 11, so as to indicate different sequence number ranges respectively.

Further, the header of the MAC PDU may include at least one of a first indication field indicating whether the UE is in a dual connectivity state, a second indication field indicating whether there is the MAC-I, a third indication field indicating a length of the MAC-I, a fourth indication field indicating a PDCP packet sequence number, and a reserved field.

A first value of the second indication field may indicate that there is the MAC-I, and a second value of the second indication field may indicate that there is no MAC-I.

A first value of the third indication field may indicate that the length of the MAC-I is 32 bits, a second value of the third indication field may indicate that the length of the MAC-I is 64 bits, a third value of the third indication field may indicate that there is no MAC-I, and a fourth value of the third indication field may indicate an actual length of the MAC-I and implicitly indicate that there is the MAC-I.

A corresponding MAC PDU configuration will be described hereinafter in conjunction with the drawings.

As shown in FIGS. 10 to 17, the fourth indication field may occupy the latter four bits of the header of the MAC PDU, and the first indication field, the second indication field, the third indication field and/or the reserved field may occupy the former four bits of the header of the MAC PDU.

Figure 10:
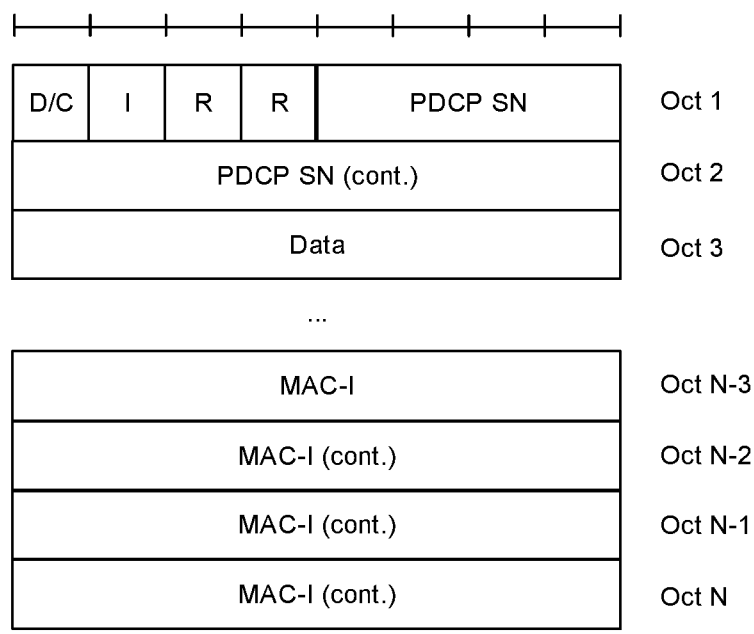
FIGS. 10-21 are schematic views showing an MAC PDU according to the second embodiment of the present disclosure.

To be specific, as shown in FIG. 10, a first bit of the header of the MAC PDU may be the first indication field (corresponding to D/C in FIG. 10), a second bit may be the second indication field (corresponding to I in FIG. 10), third and fourth bits may be the reserved field (corresponding R in FIG. 10), and the latter four bits may be the fourth indication field (corresponding to PDCP SN in FIG. 10). When I=1, it means that there is the MAC-I for the PDU, and when I=0, it means that there is no MAC-I for the PDU, and vice versa. MAC-I may have a length of 32 or 64 bits.

Figure 11:
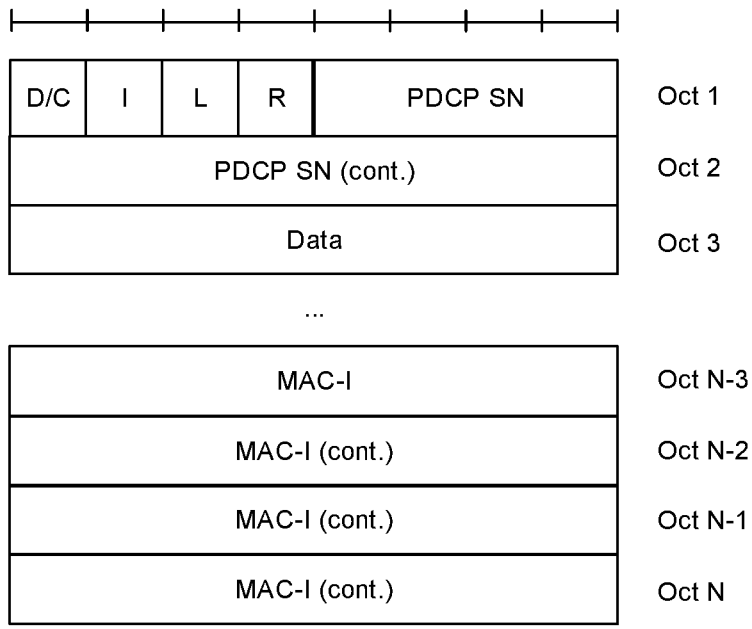

To be specific, as shown in FIG. 11, the first bit of the header of the MAC PDU may be the first indication field (corresponding to D/C in FIG. 11), the second bit may be the second indication field (corresponding to I in FIG. 11), the third bit may be the third indication field (corresponding to L in FIG. 11), the fourth bit may be the reserved field (corresponding R in FIG. 11), and the latter four bits may be the fourth indication field (corresponding to PDCP SN in FIG. 11). When I=1, it means that there is the MAC-I for the PDU, and when I=0, it means that there is no MAC-I for the PDU, and vice versa. When L=1, it means that MAC-I has a length of 32 bits, and when L=0, it means that MAC-I has a length of 64 bits, and vice versa.

Figure 12:
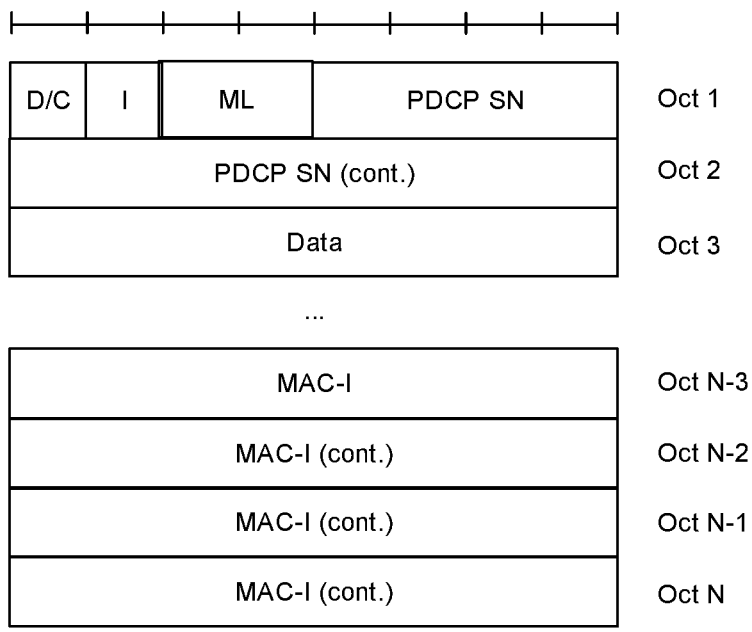

To be specific, as shown in FIG. 12, the first bit of the header of the MAC PDU may be the first indication field (corresponding to D/C in FIG. 12), the second bit may be the second indication field (corresponding to I in FIG. 12), the third and fourth bits may be the third indication field (corresponding to ML in FIG. 12), and the latter four bits may be the fourth indication field (corresponding to PDCP SN in FIG. 12). When I=1, it means that there is the MAC-I for the PDU, and when I=0, it means that there is no MAC-I for the PDU, and vice versa. ML represents the length of MAC-I.

Figure 13:
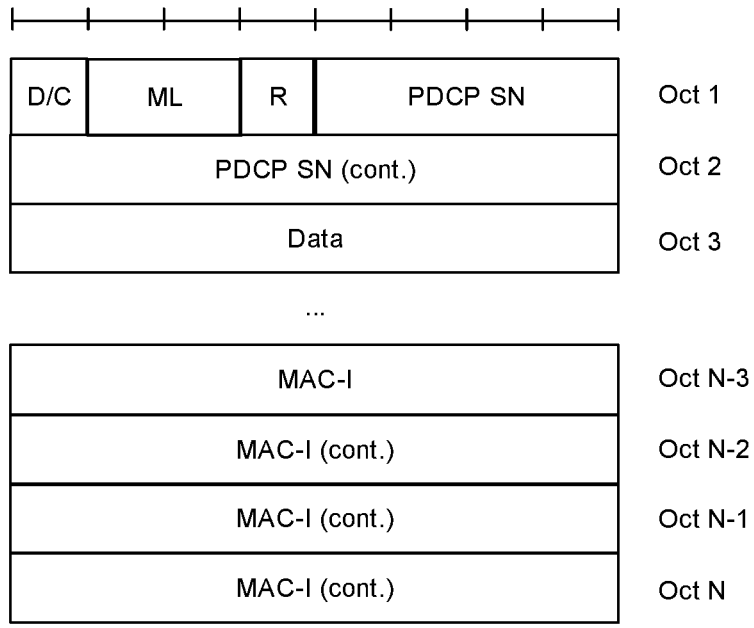

To be specific, as shown in FIG. 13, the first bit of the header of the MAC PDU may be the first indication field (corresponding to D/C in FIG. 13), the second and third bits may be the third indication field (corresponding to ML in FIG. 13), the fourth bit may be the reserved field (corresponding to R in FIG. 13), and the latter four bits may be the fourth indication field (corresponding to PDCP SN in FIG. 13). When ML=0, it means that there is the MAC-I, and ML of any other value represents the length of MAC-I.

Figure 14:
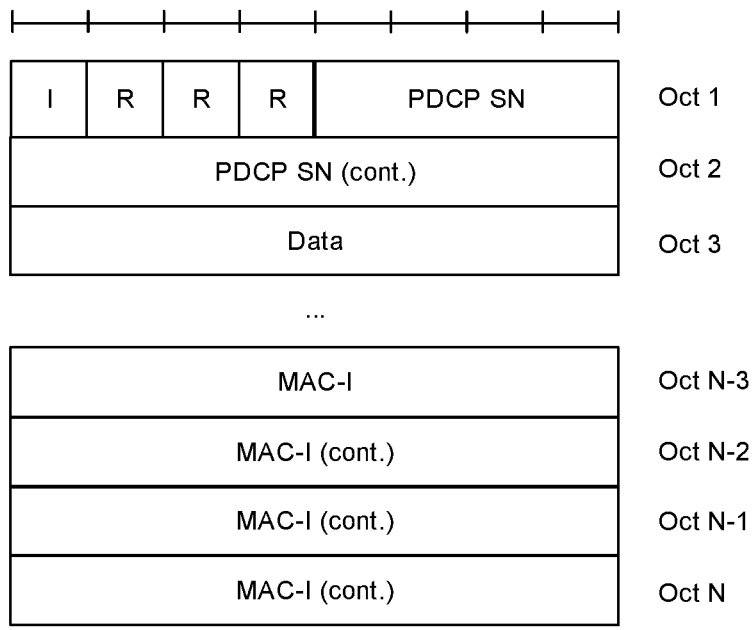

To be specific, as shown in FIG. 14, the first bit of the header of the MAC PDU may be the second indication field (corresponding to I in FIG. 14), the second to fourth bits may be the reserved field (corresponding to R in FIG. 14), and the latter four bits may be the fourth indication field (corresponding to PDCP SN in FIG. 14). When I=1, it means that there is the MAC-I for the PDU, and when I=0, it means that there is no MAC-I for the PDU, and vice versa.

Figure 15:
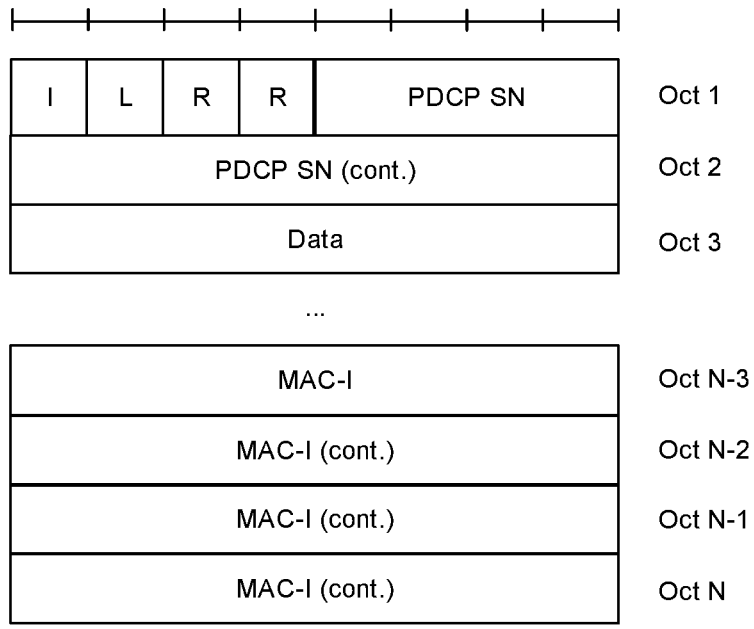

To be specific, as shown in FIG. 15, the first bit of the header of the MAC PDU may be the second indication field (corresponding to I in FIG. 15), the second bit may be the third indication field (corresponding to L in FIG. 15), the third and fourth bits may be the reserved field (corresponding to R in FIG. 15), and the latter four bits may be the fourth indication field (corresponding to PDCP SN in FIG. 15). When I=1, it means that there is the MAC-I for the PDU, and when I=0, it means that there is no MAC-I for the PDU, and vice versa. When L−1, it means that MAC-I has a length of 32 bits, and when L=0, it means that MAC-I has a length of 64 bits, and vice versa.

Figure 16:
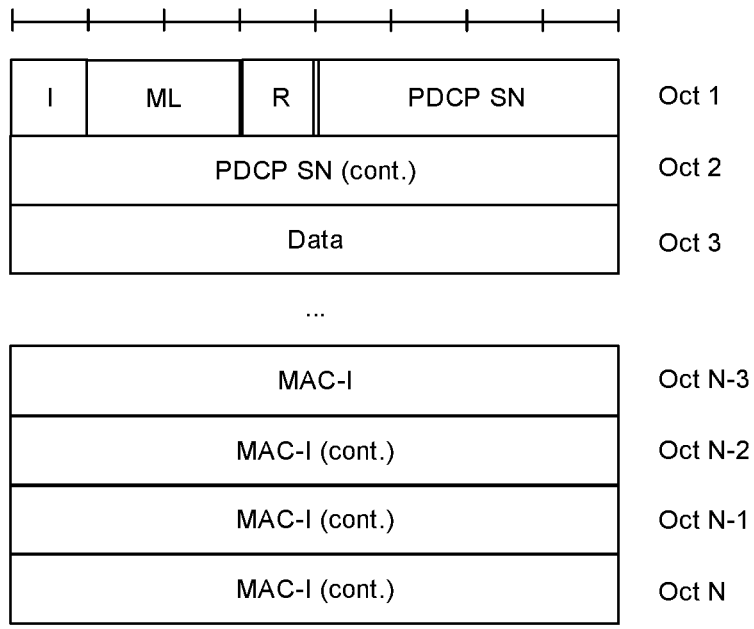

To be specific, as shown in FIG. 16, the first bit of the header of the MAC PDU may be the second indication field (corresponding to I in FIG. 16), the second and third bits may be the third indication field (corresponding to ML in FIG. 16), the fourth bit may be the reserved field (corresponding to R in FIG. 16), and the latter four bits may be the fourth indication field (corresponding to PDCP SN in FIG. 16). When I=1, it means that there is the MAC-I for the PDU, and when I=0, it means that there is no MAC-I for the PDU, and vice versa. ML represents a length of MAC-I.

Figure 17:
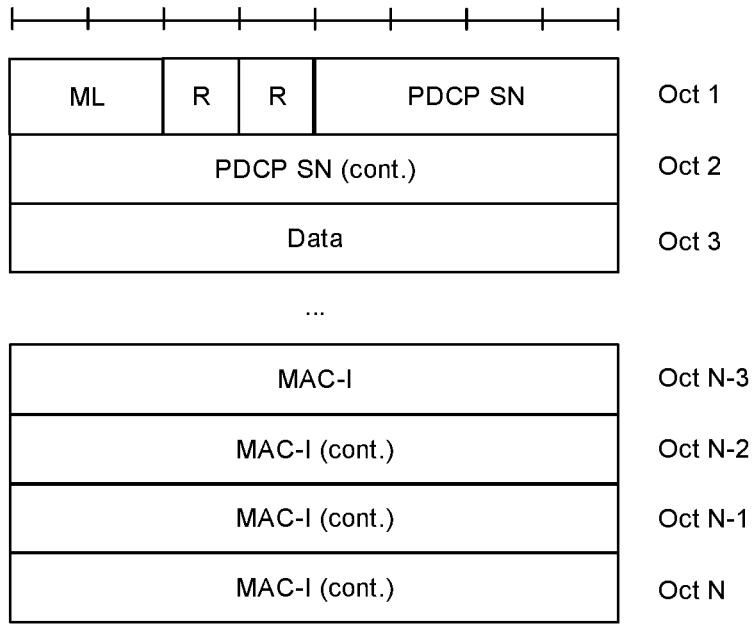

To be specific, as shown in FIG. 17, the first and second bits of the header of the MAC PDU may be the third indication field (corresponding to ML in FIG. 17), the third and fourth bits may be the reserved field (corresponding to R in FIG. 17), and the latter four bits may be the fourth indication field (corresponding to PDCP SN in FIG. 17). When ML=0, it means that there is no MAC-I, and ML of any other value represents a length of MAC-I.

The scenarios where the latter four bits of the MAC PDU are occupied by the fourth indication field have been described hereinabove, and scenarios where the latter two bits of the MAC PDU are occupied by the fourth indication field will be described hereinafter.

To be specific, as shown in FIGS. 18 to 22, the fourth indication field may occupy the latter two bits of the header of the MAC PDU, and the first indication field, the second indication field, the third indication field and/or the reserved field may occupy the former six bits of the header of the MAC PDU.

Figure 18:
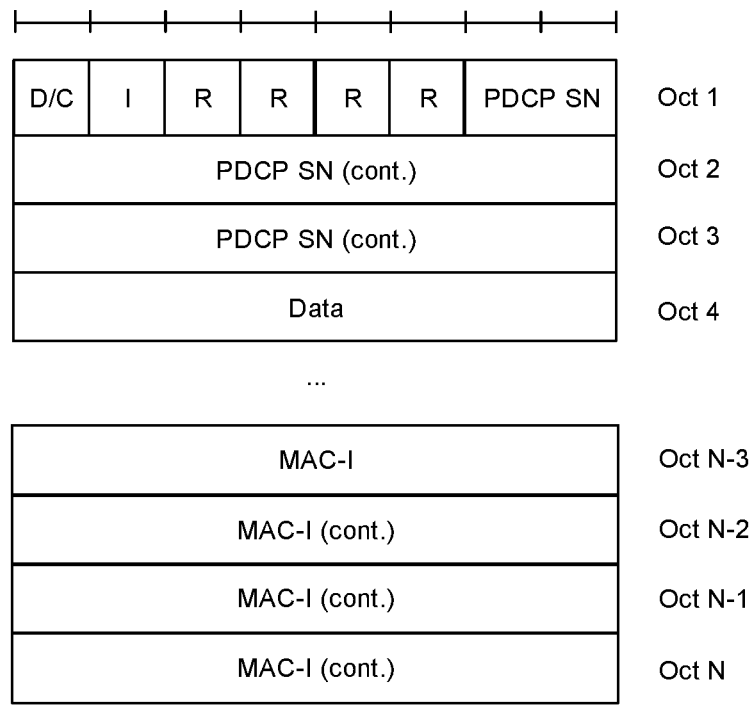

To be specific, as shown in FIG. 18, a first bit of the header of the MAC PDU may be the first indication field (corresponding to D/C in FIG. 18), a second bit may be the second indication field (corresponding to I in FIG. 18), third to sixth bits may be the reserved field (corresponding to R in FIG. 18), and the latter two bits may be the fourth indication field (corresponding to PDCP SN in FIG. 18). When I=1, it means that there is the MAC-I for the PDU, and when I=0, it means that there is no MAC-I for the PDU, and vice versa.

Figure 19:
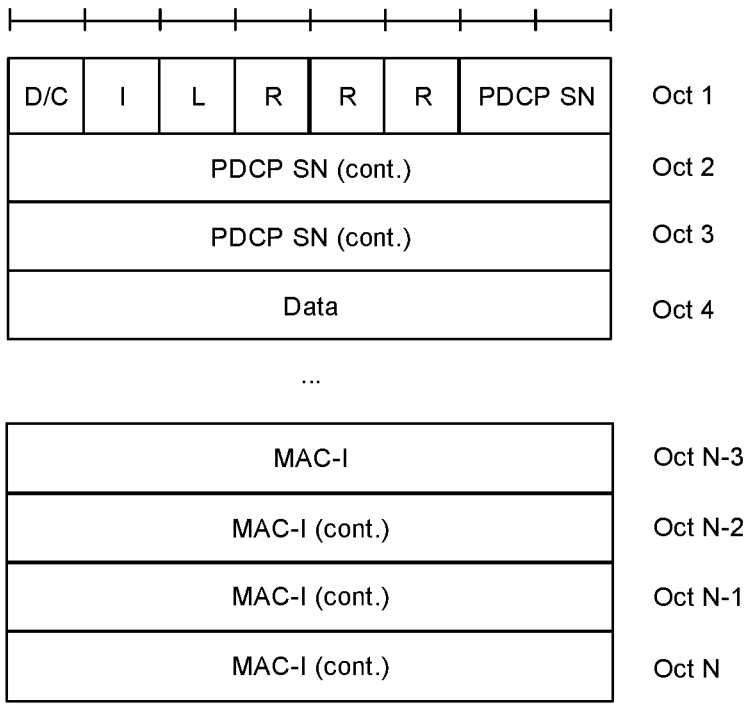

To be specific, as shown in FIG. 19, the first bit of the header of the MAC PDU may be the first indication field (corresponding to D/C in FIG. 19), the second bit may be the second indication field (corresponding to I in FIG. 19), the third bit may be the third indication field (corresponding to L in FIG. 19), the fourth to sixth bits may be the reserved field (corresponding to R in FIG. 19), and the latter two bits may be the fourth indication field (corresponding to PDCP SN in FIG. 19). When I=1, it means that there is the MAC-I for the PDU, and when I=0, it means that there is no MAC-I for the PDU, and vice versa. When L=1, it means that MAC-I has a length of 32 bits, and when L=0, it means that MAC-I has a length of 64 bits, and vice versa.

Figure 20:
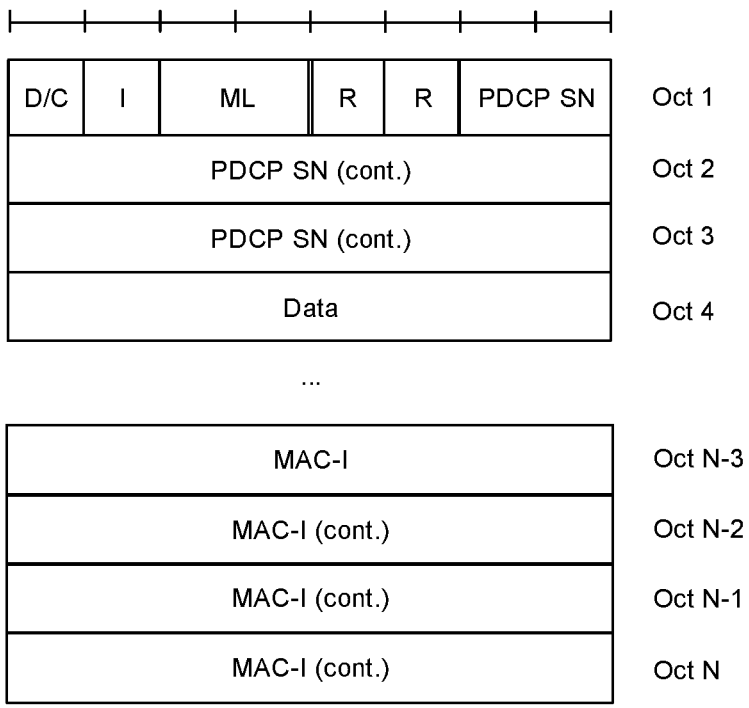

To be specific, as shown in FIG. 20, the first bit of the header of the MAC PDU may be the first indication field (corresponding to D/C in FIG. 20), the second bit may be the second indication field (corresponding to I in FIG. 20), the third and fourth bits may be the third indication field (corresponding to ML in FIG. 20), the fifth and sixth bits may be the reserved field (corresponding to R in FIG. 20), and the latter two bits may be the fourth indication field (corresponding to PDCP SN in FIG. 20). When I=1, it means that there is the MAC-I for the PDU, and when I=0, it means that there is no MAC-I for the PDU, and vice versa. ML represents a length of MAC-I.

Figure 21:
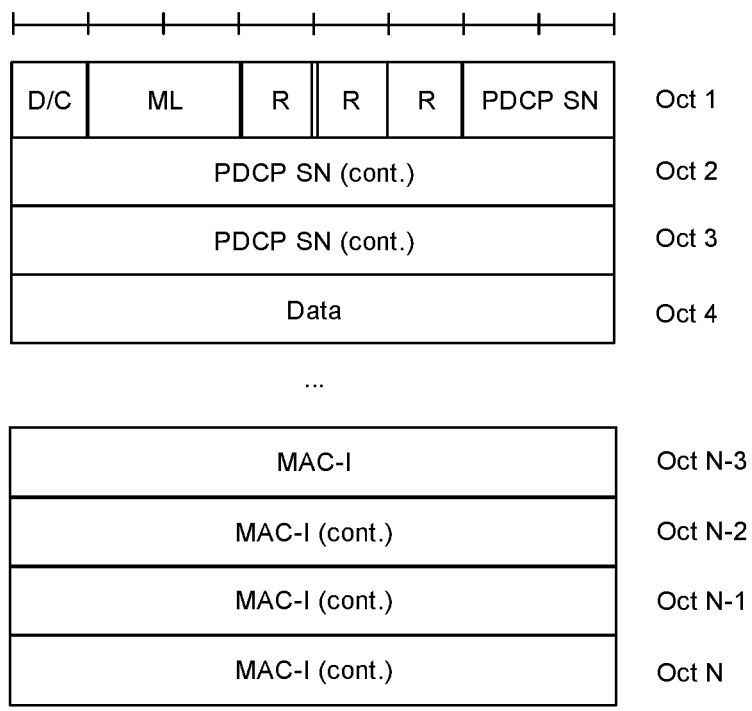

To be specific, as shown in FIG. 21, the first bit of the header of the MAC PDU may be the first indication field (corresponding to D/C in FIG. 21), the second and third bits may be the third indication field (corresponding to ML in FIG. 21), the fourth to sixth bits may be the reserved field (corresponding to R in FIG. 21), and the latter two bits may be the fourth indication field (corresponding to PDCP SN in FIG. 21). When ML=0, it means that there is no MAC-I, and ML of any other value represents a length of MAC-I.

According to the MAC PDU configuration method in the embodiments of the present disclosure, the network device may configure the MAC PDU carrying the indication field indicating the MAC-I for the UE, so as to indicate the UE to initiate the DRB integrity protection process, thereby to ensure the reliability of the data transmission.

The MAC PDU configuration method in different scenarios has been described hereinabove, and the network device will be described hereinafter in conjunction with the drawings.

Figure 22:
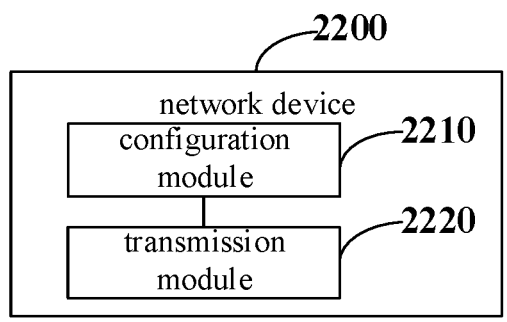
FIG. 22 is a schematic view showing the network device according to the second embodiment of the present disclosure.

As shown in FIG. 22, the present disclosure provides in some embodiments a network device 2200 capable of implementing the above-mentioned MAC PDU configuration method with a same beneficial effect.

The network device 2200 may include: a configuration module 2210 configured to configure an MAC PDU in accordance with an integrity message authentication code, a header of the MAC PDU including an indication field indicating the integrity message authentication code; and a transmission module 2220 configured to transmit the configured MAC PDU to a UE.

An MAC CE of the MAC PDU may include at least one of a first indication bit indicating a data packet sequence number, a second indication bit indicating a logical channel serial number, and a third indication bit indicating a DRB identity. All the data packet sequence numbers may be divided into N sequence number ranges, and different values of the first indication bit may represent different sequence number ranges, where N is a positive integer.

The header of the MAC PDU may include at least one of a first indication field indicating whether the UE is in a dual connectivity state, a second indication field indicating whether there is the MAC-I, a third indication field indicating a length of the MAC-I, a fourth indication field indicating a PDCP packet sequence number, and a reserved field.

A first value of the first indication field may indicate that the UE is in dual connectivity state, and a second value of the first indication field may indicate that the UE is in a single connectivity state. A first value of the second indication field may indicate that there is the MAC-I, and a second value of the second indication field may indicate that there is no MAC-I. A first value of the third indication field may indicate that the MAC-I has a length of 32 bits, a second value of the third indication field may indicate that the MAC-I has a length of 64 bits, a third value of the third indication field may indicate that there is no MAC-I, and a fourth value of the third indication field may indicate an actual length of the MAC-I and implicitly indicate that there is the MAC-I.

The fourth indication field may occupy latter four bits of the header of the MAC PDU, and the first indication field, the second indication field, the third indication field and/or the reserved field may occupy former four bits of the header of the MAC PDU.

Alternatively, the fourth indication field may occupy latter two bits of the header of the MAC PDU, and the first indication field, the second indication field, the third indication field and/or the reserved field may occupy former six bits of the header of the MAC PDU.

It should be appreciated that, the network side device may configure the MAC PDU carrying the indication field indicating the MAC-I for the UE, so as to indicate the UE to initiate the DRB integrity protection process, thereby to ensure the reliability of the data transmission.

In order to achieve the above purpose in a better manner, the present disclosure further provides in some embodiments a network device, which includes a processor, a memory, and a computer program stored in the memory and executed by the processor. The processor is configured to execute the computer program so as to implement the above-mentioned MAC PDU configuration method. In addition, the present disclosure further provides in some embodiments a computer-readable storage medium storing therein a computer program. The computer program is executed by a processor so as to implement the above-mentioned MAC PDU configuration method.

Figure 23:
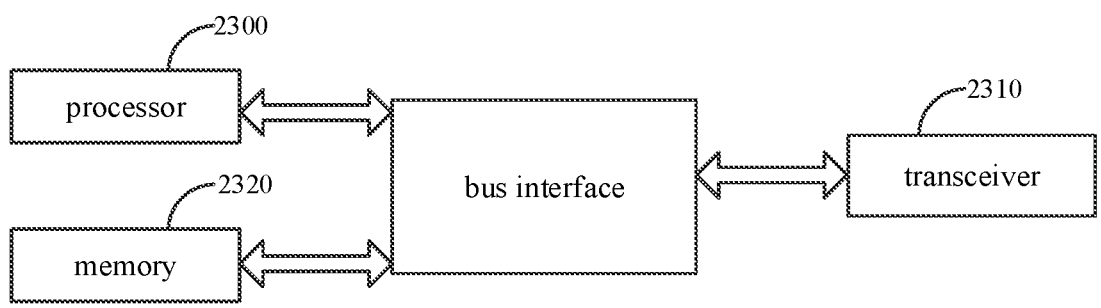
FIG. 23 is a block diagram of the network device according to the second embodiment of the present disclosure.

To be specific, as shown in FIG. 23, the present disclosure further provides in the embodiment a network device which includes a processor 2300, a memory 2320 connected to the processor 2300 via a bus interface, and a transceiver 2310 connected to the processor 2300 via the bus interface. The memory 2320 is configured to store therein programs and data for the operation of the processor. Data information or a pilot signal may be transmitted through the transceiver 2310, and an uplink control channel may be received through the transceiver 2310. The processor 2300 is configured to call and execute the programs and data stored in the memory 2320 so as to: configure an MAC PDU in accordance with an integrity message authentication code, a header of the MAC PDU including an indication field indicating the integrity message authentication code; and transmit through the transceiver 2310 the configured MAC PDU to a UE. The transceiver 2310 is configured to receive and transmit data under the control of the processor 2300.

In FIG. 23, bus architecture may include a number of buses and bridges connected to each other, so as to connect various circuits for one or more processors 2300 and one or more memories 2320. In addition, as is known in the art, the bus architecture may be used to connect any other circuits, such as a circuit for a peripheral device, a circuit for a voltage stabilizer and a power management circuit, which are not particularly defined herein. A bus interface may be provided, and the transceiver 2310 may consist of a plurality of elements, e.g., a transmitter and a receiver for communication with any other devices over a transmission medium. The processor 2300 may take charge of managing the bus architecture as well general processings. The memory 2320 may store therein data for the operation of the processor 2300.

To be specific, an MAC CE of the MAC PDU may include at least one of a first indication bit indicating a data packet sequence number, a second indication bit indicating a logical channel serial number, and a third indication bit indicating a DRB identity. All the data packet sequence numbers may be divided into N sequence number ranges, and different values of the first indication bit may represent different sequence number ranges, where N is a positive integer.

The header of the MAC CE may include at least one of a first indication field indicating whether the UE is in a dual connectivity state, a second indication field indicating whether there is the MAC-I, a third indication field indicating a length of the MAC-I, a fourth indication field indicating a PDCP packet sequence number, and a reserved field.

To be specific, a first value of the first indication field may indicate that the UE is in dual connectivity state, and a second value of the first indication field may indicate that the UE is in a single connectivity state. A first value of the second indication field may indicate that there is the MAC-I, and a second value of the second indication field may indicate that there is no MAC-I. A first value of the third indication field may indicate that the MAC-I has a length of 32 bits, a second value of the third indication field may indicate that the MAC-I has a length of 64 bits, a third value of the third indication field may indicate that there is no MAC-I, and a fourth value of the third indication field may indicate an actual length of the MAC-I and implicitly indicate that there is the MAC-I.

To be specific, the fourth indication field may occupy latter four bits of the header of the MAC PDU, and the first indication field, the second indication field, the third indication field and/or the reserved field may occupy former four bits of the header of the MAC PDU.

To be specific, the fourth indication field may occupy latter two bits of the header of the MAC PDU, and the first indication field, the second indication field, the third indication field and/or the reserved field may occupy former six bits of the header of the MAC PDU.

The network device may be a BTS in a GSM or CDMA system, an NB in a WCDMA system, an eNB in an LTE system, a relay or access point, or a base station in a future 5G network, which will not be particularly defined herein.

According to the embodiments of the present disclosure, the network side device may configure the MAC PDU carrying the indication field indicating the MAC-I for the UE, so as to indicate the UE to initiate the DRB integrity protection process, thereby to ensure the reliability of the data transmission.

The MAC PDU configuration method for the network device has been described hereinabove in conjunction with the first to fourth embodiments, and an MAC PDU processing method for the UE will be described hereinafter.

Figure 24:
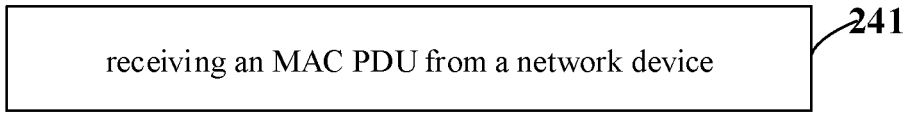
FIG. 24 is a flow chart of an MAC PDU processing method for a UE according to the second embodiment of the present disclosure.

As shown in FIG. 24, the present disclosure further provides in some embodiments an MAC PDU processing method for a UE, which includes Step 241 of receiving an MAC PDU from a network device. A header of the MAC PDU may include an indication field indicating an MAC-I.

Subsequent to Step 241, the MAC PDU processing method may further include: detecting an MAC CE corresponding to the MAC PDU; when a first indication bit has been detected, determining a corresponding data packet sequence number; when a second indication bit has been detected, determining a corresponding logical channel serial number; and when a third indication bit has been detected, determining a corresponding DRB identity. Different values of the first indication bit indicate different sequence number ranges, where N is a positive integer.

Subsequent to Step 241, the MAC PDU processing method may further include: detecting the MAC CE corresponding to the MAC PDU; when a first indication field has been detected, determining whether the UE is currently in a dual connectivity state; when a second indication field has been detected, determining whether there is an MAC-I; when a third indication field has been detected, determining a length of the MAC-I; and when a fourth indication field has been detected, determining a PDCP packet sequence number.

To be specific, the determining whether the UE is currently in the dual connectivity state when the first indication field has been detected may include: when a first value of the first indication field has been detected, determining that the UE is currently in the dual connectivity state; and when a second value of the first indication field has been detected, determining that the UE is currently in a single connectivity state.

To be specific, the determining whether there is the MAC-I when the second indication field has been detected may include: when a first value of the second indication field has been detected, determining that there is the MAC-I; and when a second value of the second indication field has been detected, determining that there is no MAC-I.

To be specific, the determining the length of the MAC-I when the third indication field has been detected may include: when a first value of the third indication field has been detected, determining that the length of the MAC-I is 32 bits; when a second value of the third indication field has been detected, determining that the length of the MAC-I is 64 bits; when a third value of the third indication field has been detected, determining that there is no MAC-I; and when a fourth value of the third indication field has been detected, determining an actual length of the MAC-I and implicitly indicating that there is the MAC-I.

According to the MAC PDU processing method in the embodiments of the present disclosure, the UE may receive the MAC PDU from the network device, and acquire the indication field indicating the MAC-I from the MAC PDU, so as to initiate an integrity protection process for the DRB, thereby to ensure the reliability of the data transmission.

The MAC PDU processing method in different scenarios has been described hereinabove, and the UE will be described hereinafter in conjunction with the drawings.

Figure 25:
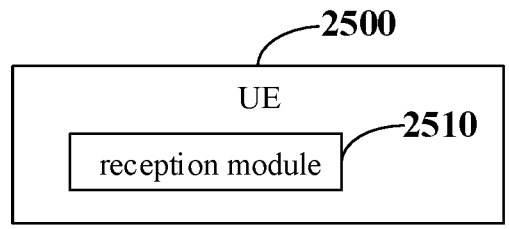
FIG. 25 is a schematic view showing the UE according to the second embodiment of the present disclosure.

As shown in FIG. 25, the present disclosure further provides in some embodiments a UE 2500 capable of implementing the above-mentioned MAC PDU processing method with a same beneficial effect. The UE 2500 may include a reception module 2510 configured to receive an MAC PDU from a network device. A header of the MAC PDU may include an indication field indicating an MAC-I.

The UE may further include: a first detection module configured to detect an MAC CE corresponding to the MAC PDU; a first processing module configured to, when a first indication bit has been detected, determine a corresponding data packet sequence number; a second processing module configured to, when a second indication bit has been detected, determine a corresponding logical channel serial number; and a third processing module configured to, when a third indication bit has been detected, determine a corresponding DRB identity. Different values of the first indication bit indicate different sequence number ranges, where N is a positive integer.

The UE may further include: a second detection module configured to detect the MAC CE corresponding to the MAC PDU; a fourth processing module configured to, when a first indication field has been detected, determine whether the UE is currently in a dual connectivity state; a fifth processing module configured to, when a second indication field has been detected, determine whether there is an MAC-I; a sixth processing module configured to, when a third indication field has been detected, determine a length of the MAC-I; and a seventh processing module configured to, when a fourth indication field has been detected, determine a PDCP packet sequence number.

The fourth processing module may include: a first processing sub-module configured to, when a first value of the first indication field has been detected, determine that the UE is currently in the dual connectivity state; and a second processing sub-module configured to, when a second value of the first indication field has been detected, determine that the UE is currently in a single connectivity state.

The fifth processing module may include: a third processing sub-module configured to, when a first value of the second indication field has been detected, determine that there is the MAC-I; and a fourth processing sub-module configured to, when a second value of the second indication field has been detected, determine that there is no MAC-I.

The sixth processing module may include: a fifth processing sub-module configured to, when a first value of the third indication field has been detected, determine that the length of the MAC-I is 32 bits; a sixth processing sub-module configured to, when a second value of the third indication field has been detected, determine that the length of the MAC-I is 64 bits; a seventh processing sub-module configured to, when a third value of the third indication field has been detected, determine that there is no MAC-I; and an eighth processing sub-module configured to, when a fourth value of the third indication field has been detected, determine an actual length of the MAC-I and implicitly indicate that there is the MAC-I.

It should be appreciated that, the UE may receive the MAC PDU from the network device, and acquire the indication field indicating the MAC-I from the MAC PDU, so as to initiate an integrity protection process for the DRB, thereby to ensure the reliability of the data transmission.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, a determination module may be a processing element arranged separately, or integrated into a chip of the above-mentioned device. In addition, these modules may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the processing elements may each of an Integrated Circuit (IC) having a signal processing capability. During the implementation, the steps of the method or the modules may be implemented through an integrated logic circuit of the processing element in the form of hardware or through instructions in the form of software.

For example, the above modules may be one or more ICs capable of implementing the above-mentioned method, e.g., one or more ASICs, one or more DSPs, or one or more FPGAs. For another example, when a certain module is implemented by calling a program code through a processing element, the processing element may be a general-purpose processor, e.g., a CPU or any other processor capable of calling the program code. These modules may be integrated together and implemented in the form of SOC.

In order to achieve the above purpose in a better manner, the present disclosure further provides in some embodiments a UE, which includes a processor, a memory, and a computer program stored in the memory and executed by the processor. The processor is configured to execute the computer program so as to implement the above-mentioned MAC PDU processing method. In addition, the present disclosure further provides in some embodiments a computer-readable storage medium storing therein a computer program. The computer program is executed by a processor so as to implement the above-mentioned MAC PDU processing method.

Figure 26:
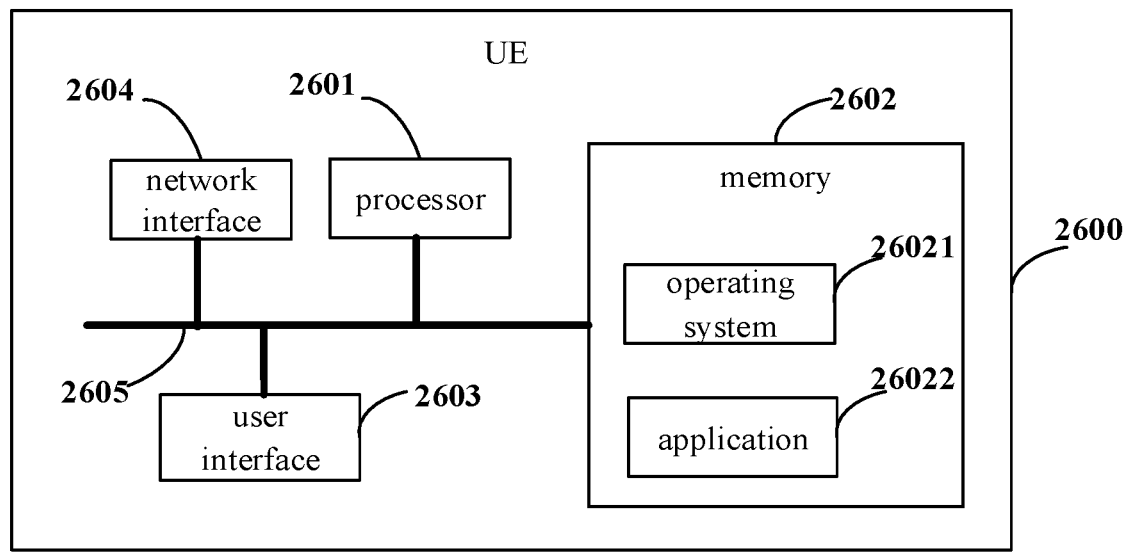
FIG. 26 is a block diagram of the UE according to an embodiment of the present disclosure.

To be specific, as shown in FIG. 26, the present disclosure further provides in some embodiments a UE 2600 which includes at least one processor 2601, a memory 2602, a user interface 2603 and a network interface 2604. The components of the UE 2600 may be coupled together through a bus system 2605. It should be appreciated that, the bus system 2605 is configured to achieve connection and communication among the components. Apart from a data bus, the bus system 2605 may further include a power source bus, a control bus and a state signal bus. For clarification, all these buses in FIG. 26 may be collectively called as bus system 2605.

The user interface 2603 may include a display, a keyboard or a pointing device (e.g., mouse, track ball, touch plate or touch panel).

It should be appreciated that, the memory 2602 may be a volatile memory, a nonvolatile memory or both. The nonvolatile memory may be an ROM, a PROM, an EPROM, an EEPROM or a flash memory. The volatile memory may be an RAM which serves as an external high-speed cache. Illustratively but nonrestrictively, the RAM may include SRAM, DRAM, SDRAM, DDRSDRAM, ESDRAM, SLDRAM or DRRAM. The memory 2602 intends to include, but not limited to, the above-mentioned and any other appropriate memories.

In a possible embodiment of the present disclosure, the following elements may be stored in the memory 2602: an executable module or data structure, a subset or an extended set thereof, an operating system 26021 and an application 26022.

The operating system 26021 may include various system programs, e.g., a framework layer, a core layer and a driving layer, so as to implement various basic services and process hardware-based tasks. The application 26022 may include various applications, e.g., Media Player and Browser, so as to implement various application services. The programs for implementing the above-mentioned method may be included in the application 26022.

The UE 2600 may further include a computer program stored in the memory 2602 and executed by the processor 2601, e.g., a program or instruction stored in the application 26022. The computer program is executed by the processor 2601, so as to receive an MAC PDU from a network device. A header of the MAC PDU may include an indication field indicating an MAC-I.

The above-mentioned method may be applied to, or implemented by, the processor 2601. The processor 2601 may be an integrated circuit (IC) having a signal processing capability. During the implementation, the steps of the above-mentioned method may be completed through an integrated logic circuit of hardware in the processor 2601 or instructions in the form of software. The processor 2601 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 2602, and the processor 2601 may read information stored in the memory 2602 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSPD, a PLD, an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

To be specific, the processor 2601 is further configured to execute the computer program, so as to: detect an MAC CE corresponding to the MAC PDU; when a first indication bit has been detected, determine a corresponding data packet sequence number; when a second indication bit has been detected, determine a corresponding logical channel serial number; and when a third indication bit has been detected, determine a corresponding DRB identity. Different values of the first indication bit indicate different sequence number ranges, where N is a positive integer.

To be specific, the processor 2601 is further configured to execute the computer program, so as to: detect the MAC CE corresponding to the MAC PDU; when a first indication field has been detected, determine whether the UE is currently in a dual connectivity state; when a second indication field has been detected, determine whether there is an MAC-I; when a third indication field has been detected, determine a length of the MAC-I; and when a fourth indication field has been detected, determine a PDCP packet sequence number.

To be specific, the processor 2601 is further configured to execute the computer program, so as to: when a first value of the first indication field has been detected, determine that the UE is currently in the dual connectivity state; and when a second value of the first indication field has been detected, determine that the UE is currently in a single connectivity state.

To be specific, the processor 2601 is further configured to execute the computer program, so as to: when a first value of the second indication field has been detected, determine that there is the MAC-I; and when a second value of the second indication field has been detected, determine that there is no MAC-I.

To be specific, the processor 2601 is further configured to execute the computer program, so as to: when a first value of the third indication field has been detected, determine that the length of the MAC-I is 32 bits; when a second value of the third indication field has been detected, determine that the length of the MAC-I is 64 bits; when a third value of the third indication field has been detected, determine that there is no MAC-I; and when a fourth value of the third indication field has been detected, determine an actual length of the MAC-I and implicitly indicate that there is the MAC-I.

The UE may be a wireless UE or a wired UE. The wireless UE may be a device capable of providing voice data and/or any other service data to a user, e.g., a handheld device having a wireless connection function, or any other processing device capable of being connected to a wireless modem. The wireless UE may communication with one or more core networks via an RAN. The wireless UE may be a mobile terminal, e.g., a mobile phone (or cellular phone), or a computer having the mobile UE, e.g., a portable, pocket-sized, handheld, built-in or vehicle-mounted mobile device, which are capable of exchanging voice and/or data with the RAN. For example, the wireless UE may be a PCS telephone, a cordless telephone, an SIP phone, a WLL station, or a PDA. In addition, the wireless terminal may also be called as system, subscriber unit, subscriber station, mobile station, mobile, remote station, remote terminal, access terminal, user terminal, user agent or user device, which will not be particularly defined herein.

According to the embodiments of the present disclosure, the UE may receive the MAC PDU from the network device, and acquire the indication field indicating the MAC-I, so as to initiate the integrity protection process for the DRB, thereby to ensure the reliability of the data transmission.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other. It should be appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A Data Radio Bearer (DRB) integrity protection configuration method for a User Equipment (UE), comprising:
receiving configuration information indicating a DRB integrity protection configuration from a network device; and
enabling a predetermined control process for DRB integrity protection in accordance with the configuration information, wherein the predetermined control process is a DRB integrity protection activation process or a DRB integrity protection deactivation process;
wherein the receiving the configuration information indicating the DRB integrity protection configuration from the network device comprises receiving first configuration information indicating a DRB configuration from the network device, wherein the first configuration information carries a DRB integrity protection command by default;
wherein the enabling the predetermined control process for the DRB integrity protection in accordance with the configuration information comprises:
activating the DRB integrity protection when the first configuration information has been received and service transmission has been initiated; or
deactivating the DRB integrity protection when the DRB has been released; or
upon the receipt of a first instruction for initiating a DRB integrity protection activation process from the network device, activating the DRB integrity protection; or,
upon the receipt of a second instruction for initiating a DRB integrity protection deactivation process from the network device, deactivating the DRB integrity protection;
wherein the configuration information comprises at least one of deactivation timer information for initiating the DRB integrity protection deactivation process, activation timer information for initiating the DRB integrity protection activation process, activation sequence number information for initiating the DRB integrity protection deactivation process, and deactivation sequence number information for initiating the DRB integrity protection deactivation process;
wherein when the configuration information comprises the deactivation timer information, subsequent to activating the DRB integrity protection, the DRB integrity protection configuration method further comprises;
starting a corresponding deactivation timer in accordance with the deactivation timer information, and deactivating the DRB integrity protection when the deactivation timer has been expired.

2. The DRB integrity protection configuration method according to claim 1, wherein identification information about a corresponding DRB is carried in the DRB integrity protection command.

3. The DRB integrity protection configuration method according to claim 1, wherein subsequent to enabling the predetermined control process for the DRB integrity protection in accordance with the configuration information, the DRB integrity protection configuration method further comprises, upon the receipt of the configuration information from the network device, when an event indicating a failure of the DRB integrity protection has been detected, transmitting request information for requesting the activation of the DRB integrity protection to the network device, so that the network device activates the DRB integrity protection in accordance with the request information.

4. The DRB integrity protection configuration method according to claim 3, wherein the transmitting the request information for requesting the activation of the DRB integrity protection to the network device comprises transmitting the request information for requesting the activation of the DRB integrity protection to the network device through the enhanced RRC signaling or MAC CE signaling.

5. The DRB integrity protection configuration method according to claim 1, wherein the receiving the configuration information indicating the DRB integrity protection configuration from the network device comprises receiving a predetermined control process start instruction for the DRB integrity protection from the network device through an MAC CE, and the configuration information indicating the DRB integrity protection configuration is carried in the predetermined control process start instruction.

6. The DRB integrity protection configuration method according to claim 1, wherein the receiving the configuration information indicating the DRB integrity protection configuration from the network device comprises receiving the configuration information indicating a predetermined control process configuration for the DRB integrity protection from the network device through the MAC CE, RRC signaling, the physical layer signaling or Packet Data Convergence Protocol (PDCP) control signaling.

7. A user equipment (UE), comprising a processor, a memory, and a computer program stored in the memory and executed by the processor, wherein the processor is configured to execute the computer program so as to implement the DRB integrity protection configuration method according to claim 1.

8. The DRB integrity protection configuration method according to claim 1, wherein when the configuration information comprises the activation sequence number information, the activating the DRB integrity protection upon the receipt of the first instruction for initiating the DRB integrity protection activation process from the network device comprises, when the first instruction for initiating the DRB integrity protection activation process has been received from the network device and a sequence number of a transmitted data packet is an activation sequence number corresponding to the activation sequence number information, activating the DRB integrity protection.

9. The DRB integrity protection configuration method according to claim 1, wherein when the configuration information comprises the deactivation sequence number information, the deactivating the DRB integrity protection upon the receipt of the second instruction for initiating the DRB integrity protection deactivation process from the network device comprises, when the second instruction for initiating the DRB integrity protection deactivation process from the network device and the sequence number of the transmitted data packet is a deactivation sequence number corresponding to the deactivation sequence number information, deactivating the DRB integrity protection.

10. The DRB integrity protection configuration method according to claim 1, wherein when the configuration information comprises the activation timer information, subsequent to deactivating the DRB integrity protection, the DRB integrity protection configuration method further comprises:

starting a corresponding activation timer according to the activation timer information; and activating the DRB integrity protection when the activation timer has been expired.

11. A Data Radio Bearer (DRB) integrity protection configuration method for a network device, comprising transmitting configuration information indicating a DRB integrity protection configuration to a user equipment (UE); wherein the transmitting the configuration information indicating the DRB integrity protection configuration to the UE comprises transmitting first configuration information indicating a DRB configuration to the UE, and the first configuration information carries a DRB integrity protection command by default;

wherein the DRB integrity protection command is used to activate the DRB integrity protection when the first configuration information has been received and service transmission has been initiate; or, deactivate the DRB integrity protection when the DRB has been release; or, activate the DRB integrity protection upon the receipt of a first instruction for initiating a DRB integrity protection activation process from the network device; or, deactivate the DRB integrity protection upon the receipt of a second instruction for initiating a DRB integrity protection deactivation process from the network device;

wherein the configuration information comprises at least one of deactivation timer information for initiating the DRB integrity protection deactivation process, activation timer information for initiating the DRB integrity protection activation process, activation sequence number information for initiating the DRB integrity protection deactivation process, and deactivation sequence number information for initiating the DRB integrity protection deactivation process;

wherein when the configuration information comprises the deactivation timer information, subsequent to activating the DRB integrity protection, the configuration information is further used to;

start a corresponding deactivation timer in accordance with the deactivation timer information, and deactivating the DRB integrity protection when the deactivation timer has been expired.

12. A network device, comprising a processor, a memory, and a computer program stored in the memory and executed by the processor, wherein the processor is configured to execute the computer program so as to implement the DRB integrity protection configuration method according to claim 11.

* * * * *